United States Patent
Hidaka et al.

(10) Patent No.: US 11,894,701 B2
(45) Date of Patent: *Feb. 6, 2024

(54) CELL-BALANCING METHOD AND BATTERY MANAGEMENT SYSTEM PERFORMING THE SAME

(71) Applicant: Samsung SDI Co., Ltd., Yongin-si (KR)

(72) Inventors: Takao Hidaka, Yongin-si (KR); Hwa-Su Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 119 days.

This patent is subject to a terminal disclaimer.

(21) Appl. No.: 17/346,165

(22) Filed: Jun. 11, 2021

(65) Prior Publication Data

US 2021/0305817 A1  Sep. 30, 2021

Related U.S. Application Data

(62) Division of application No. 16/293,419, filed on Mar. 5, 2019, now Pat. No. 11,101,668.

(30) Foreign Application Priority Data

Mar. 6, 2018 (KR) .......................... 10-2018-0026458

(51) Int. Cl.
*H02J 7/00* (2006.01)

(52) U.S. Cl.
CPC .......... *H02J 7/0016* (2013.01); *H02J 7/0014* (2013.01); *H02J 7/0048* (2020.01); *H02J 7/0024* (2013.01);

(Continued)

(58) Field of Classification Search
CPC ...... H02J 7/0016; H02J 7/0014; H02J 7/0048; H02J 7/0024; H02J 7/0025; H02J 7/007182

(Continued)

(56) References Cited

U.S. PATENT DOCUMENTS

2010/0194339 A1  8/2010  Yang et al.
2012/0086399 A1  4/2012  Choi (Continued)

FOREIGN PATENT DOCUMENTS

JP  2012-115100 A  6/2012
JP  2016-77115 A  5/2016

(Continued)

OTHER PUBLICATIONS

Office Action; Corresponding Korean Patent Application No. 10-2018-0026458 dated May 31, 2023; 6 pps.

(Continued)

*Primary Examiner* — Zixuan Zhou
(74) *Attorney, Agent, or Firm* — Lewis Roca Rothgerber Christie LLP

(57) ABSTRACT

A battery management system may include a plurality of balancing resistors respectively forming balancing discharging paths of cells connected in series to each other, a plurality of balancing switches respectively connected between the cells and the balancing resistors, and configured to control cell-balancing of each of the cells, a voltage-detecting circuit for detecting respective cell voltages of the cells, and a battery controller for acquiring respective balancing capacities of the cells based on the cell voltages, for obtaining duty cycles of the balancing switches according to the balancing capacities, and for scaling the duty cycles of the balancing switches according to a sum of duty cycles of two adjacent cells from among the cells.

12 Claims, 27 Drawing Sheets

(52) U.S. Cl.
CPC ....... *H02J 7/0025* (2020.01); *H02J 7/007182* (2020.01)

(58) Field of Classification Search
USPC .................................................. 320/116–119
See application file for complete search history.

(56) References Cited

U.S. PATENT DOCUMENTS

| | | |
|---|---|---|
| 2012/0133330 A1 | 5/2012 | Kamata et al. |
| 2015/0229140 A1 | 8/2015 | Kim |
| 2015/0336469 A1 | 11/2015 | Ladhari et al. |
| 2022/0120819 A1* | 4/2022 | Li ........................ G01R 31/396 |

FOREIGN PATENT DOCUMENTS

| | | |
|---|---|---|
| KR | 10-2010-0089768 A | 8/2010 |
| KR | 10-2012-0037682 A | 4/2012 |
| KR | 10-2014-0089800 A | 7/2015 |
| KR | 10-2015-0093415 A | 8/2015 |
| KR | 10-2015-0103084 A | 9/2015 |

OTHER PUBLICATIONS

Korean Notice of Allowance, Corresponding Application No. 10-2018-0086399 A1, dated Nov. 27, 2023, 2 pps.

* cited by examiner

CELL-BALANCING METHOD AND BATTERY MANAGEMENT SYSTEM PERFORMING THE SAME

CROSS-REFERENCE TO RELATED APPLICATIONS

This application is a divisional of U.S. patent application Ser. No. 16/293,419, filed Mar. 5, 2019, which claims priority to and the benefit of Korean Patent Application No. 10-2018-0026458, filed Mar. 6, 2018, the entire content of both of which is incorporated herein by reference.

BACKGROUND

1. Field

Embodiments disclosed herein relate to a cell-balancing method and a battery management system for performing the same.

2. Description of the Related Art

Recently, according to strengthening of environmental regulations including CO2 regulations, interest in environmentally-friendly vehicles has been increasing. Accordingly, vehicle companies have been actively researching and developing pure electrical vehicles and hydrogen vehicles, as well as hybrid and plug-in hybrid vehicles.

A high-voltage battery for storing electrical energy obtained from various energy sources is applied to the environmentally-friendly vehicles. The high-voltage battery includes a plurality of cells coupled in series or coupled in parallel to provide high-voltage electrical energy. The high-voltage battery includes a battery management system (BMS) for protecting the battery when the battery improperly works by continuously or regularly detecting a voltage, a temperature, and a charging and discharging current of respective cells. A cell-balancing function for compensating an inter-cell deviation by monitoring states of the cells is one of major functions of the battery management system.

The cell-balancing may be classified as a passive type or an active type.

The passive cell-balancing method is a method of balancing a cell having large capacity with a cell having small capacity by discharging the cell charges having large capacity. The passive cell-balancing method uses a simple control method or a simple control circuit, but power generated by a discharging is consumed through heat, so radiation of heat becomes an important issue. The active cell-balancing method is a method for balancing capacities of cells by moving charges to a cell having small capacity from a cell having large capacity. The active cell-balancing method consumes less power than the passive type to thus provide better efficiency, but its control is complicated, and it generally uses more components to configure a cell-balancing control circuit.

In the passive cell-balancing method, a discharging path of each cell is constituted by a resistor (balancing resistor) for determining a discharging current, and a balancing switch. In the case of using the passive cell-balancing method, the required balance capacity may be different for each cell, but the current flowing through the discharging path when the balancing switch is turned on is the same. Therefore, when the cells that are subject to balancing simultaneously start to be balanced, the cells that are balancing objects are discharged just after the start of balancing, and the discharging of the cells of which the balancing is finished may be sequentially stopped. For this reason, when a cell-balancing circuit is designed, it may be useful to account for the radiation of heat in anticipation of power consumption in the worst condition in which all of the cells are discharged to be simultaneously balanced.

Generally, a method for increasing a balancing current may be used so as to reduce the time used to the cell-balancing, but when the balancing current increases, generation of heat caused by power consumption also increases. Increasing heat radiation performance of the substrate may result in the increase of a size of the substrate and a material cost. In addition, when the cell-balancing circuit is actually designed, the discharge current may be designed to an acceptable level to enable the heat radiation performance of the substrate, even when all of the cells are simultaneously balance-discharged, so there is a limit in increasing the balancing current for reducing the cell-balancing time.

The above information disclosed in this Background section is only for enhancement of understanding of the background of embodiments of the disclosure, and therefore it may contain information that does not form the prior art that is already known in this country to a person of ordinary skill in the art.

SUMMARY

The present disclosure provides a cell-balancing method for reducing a balancing time while maintaining a heat radiation performance of a substrate, and a battery management system for performing the same.

An embodiment of the present disclosure provides a battery management system including a plurality of balancing resistors respectively forming balancing discharging paths of cells connected in series to each other, a plurality of balancing switches respectively connected between the cells and the balancing resistors, and configured to control cell-balancing of each of the cells, a voltage-detecting circuit for detecting respective cell voltages of the cells, and a battery controller for acquiring respective balancing capacities of the cells based on the cell voltages, for obtaining duty cycles of the balancing switches according to the balancing capacities, and for scaling the duty cycles of the balancing switches according to a sum of duty cycles of two adjacent cells from among the cells.

The two adjacent cells may partly share a balancing discharging path for cell-balancing.

Balancing switches of the two adjacent cells may be alternately turned on.

The battery controller may be configured to calculate a sum of duty cycles of combination of two adjacent cells, may be configured to calculate a scale factor so that a maximum value of the sum of duty cycles is 100%, and may be configured to scale the duty cycles of the balancing switches using the scale factor.

The battery controller may be configured to set a ratio of respective duty cycles of the balancing switches based on a ratio of respective balancing capacities of the cells.

The battery management system may further include a battery integrated circuit for controlling the balancing switches according to the duty cycles of the balancing switches.

Another embodiment of the present disclosure provides a battery management system including a plurality of balancing resistors respectively forming balancing discharging paths of cells connected in series to each other, a plurality of balancing switches respectively connected between the cells and the balancing resistors for controlling a cell-balancing of each of the cells, a voltage-detecting circuit for detecting cell voltages of the cells, and a battery controller for acquiring balancing capacities of the cells based on the cell voltages, for obtaining duty cycles of the plurality of balancing switches according to the balancing capacities, and for scaling the duty cycles of the plurality of balancing switches according to a power consumption upper limit corresponding to a balancing discharging of the cells.

The battery controller may be configured to calculate a total power consumption by summing the balancing capacities of the cells, and may be configured to scale the duty cycles of the balancing switches when the total power consumption is greater than the power consumption upper limit.

The battery controller may be configured to calculate a current scale factor based on a ratio of a current upper limit on a substrate on which the balancing resistors are mounted to a sum of average balancing currents flowing in each of the balancing discharging paths, and may be configured to scale the duty cycles of the balancing switches by using the current scale factor.

The battery controller may be configured to scale the duty cycles of the balancing switches according to a current upper limit allowable to a single balancing discharging path.

The battery controller may be configured to calculate a current scale factor of each of the balancing switches based on a ratio of a current upper limit to an average balancing current flowing in each of the balancing discharging paths, and may be configured to scale the duty cycles of the balancing switches by using the current scale factor.

The battery controller may be configured to scale the duty cycles of the balancing switches according to a sum of duty cycles between two adjacent cells from among the cells.

The battery controller may set a ratio of respective duty cycles of the balancing switches based on a ratio of respective balancing capacities of the cells.

Yet another embodiment of the present disclosure provides a battery management system including a plurality of balancing resistors respectively forming balancing discharging paths of cells connected in series to each other, a plurality of balancing switches respectively connected between the cells and the balancing resistors for controlling a cell-balancing of each of the cells, a voltage-detecting circuit for detecting cell voltages of the cells, a battery controller for acquiring balancing capacities of the cells based on the cell voltage, and for obtaining duty cycles of the balancing switches according to the balancing capacities, and a battery integrated circuit for controlling operation of the balancing switches by using a balancing task, which is repeatedly executed during an execution cycle that is shorter than a balancing cycle, and which corresponds to the duty cycles, to allow a turn-on state of the balancing switches only during a part of an execution period of the balancing task.

The battery integrated circuit may be configured to count on-periods, in which the balancing switches are turned on by the balancing task within one balancing cycle, for each of the balancing switches, and may be configured to maintain a state of a balancing switch in a turn-off state until the balancing cycle ends wherein a value obtained by counting on-periods corresponds to a duration of a corresponding duty cycle.

The battery controller may set a ratio of respective duty cycles of the balancing switches based on a ratio of respective balancing capacities of the cells.

The battery controller may be configured to scale the duty cycles of the balancing switches according to a sum of duty cycles between two adjacent cells from among the cells.

The battery controller may be configured to scale the duty cycles of the balancing switches according to a power consumption upper limit of the cells.

The battery controller may be configured to scale duty cycles of the balancing switches according to a current upper limit of a single balancing discharging path.

Yet another embodiment of the present disclosure provides a cell-balancing method of a battery pack including a plurality of cells connected in series to each other, the method including detecting cell voltages of the cells, acquiring balancing capacities of the cells based on the cell voltages, acquiring duty cycles of a plurality of balancing switches for controlling a balancing discharging of the cells based on one or more respective ratios of the balancing capacities of the cells, and controlling the balancing switches based on the duty cycles.

The cell-balancing method may further include scaling the duty cycles of the balancing switches according to a sum of duty cycles between two adjacent cells from among the cells.

The cell-balancing method may further include scaling the duty cycles of the balancing switches according to a power consumption upper limit of a balancing discharging of the cells.

The cell-balancing method may further include scaling the duty cycles of the balancing switches according to a current upper limit of one of balancing discharging paths of the cells.

The controlling may include repeatedly performing a balancing task having an execution cycle that is shorter than a balancing cycle corresponding to the duty cycle, and allowing a turn-on state of the balancing switches only during a part of an execution period of the balancing task, counting periods in which the balancing switches are turned on by the balancing task within one balancing cycle for each of the balancing switches, and maintaining a state of a balancing switch in a turn-off state until the balancing cycle ends, wherein a value obtained by counting periods in which the balancing switches are turned on by the balancing task satisfies a duration of a corresponding duty cycle.

DETAILED DESCRIPTION

Figure 1:
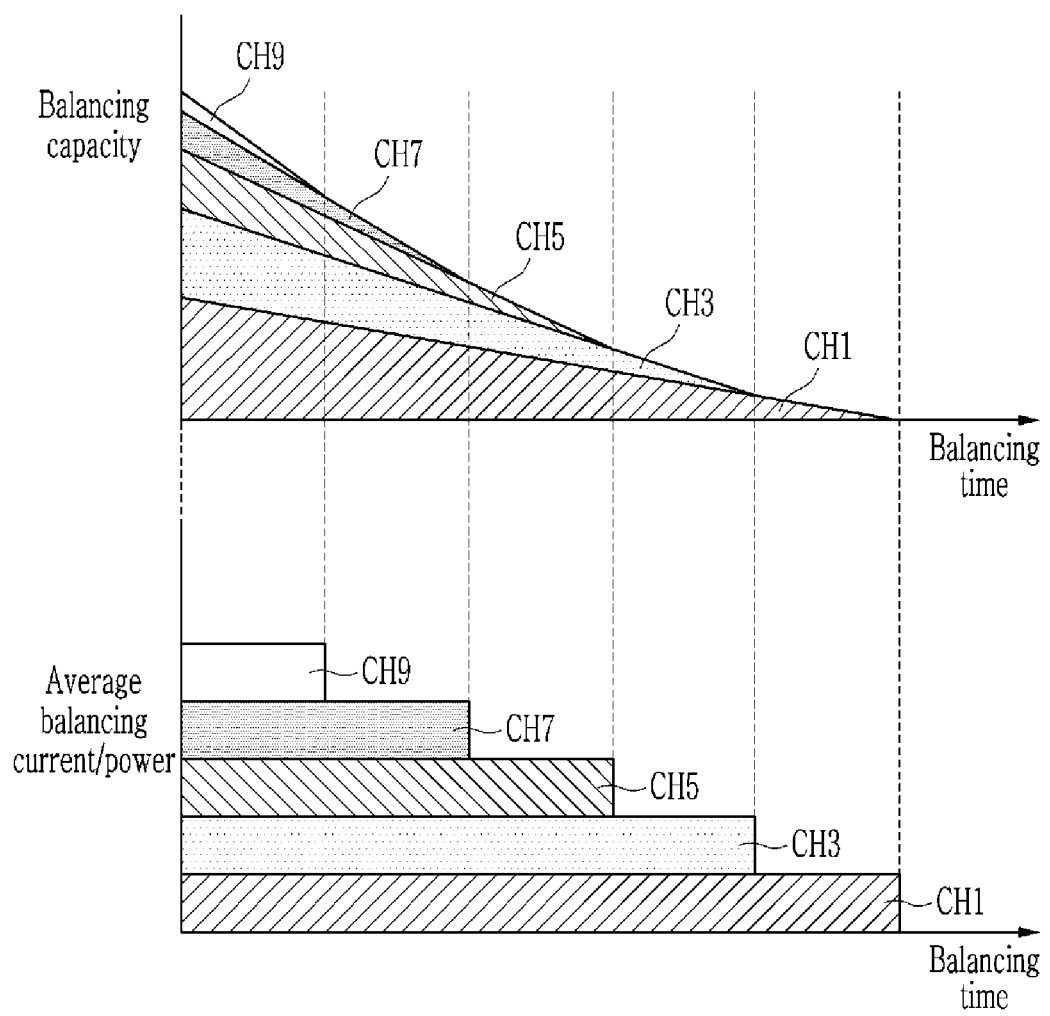
FIG. 1 shows an example of performing a cell-balancing.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 shows an example of performing a cell-balancing and depicting balancing capacity and a changing trend of balancing current/power according to a progress of cell-balancing.

In the present specification, the balancing channel means a discharging path corresponding to each cell, and the balancing channel may be configured to include at least one discharging resistor (or balancing resistor) and balancing switch. Further, the balancing capacity of each cell represents a balancing standard of each cell (e.g., a capacity at which each cell should be discharged for cell-balancing).

Referring to FIG. 1, when the cell-balancing begins, a substantially identical balancing current flows to the balancing channels (CH1, CH3, CH5, CH7, and CH9) regardless of balancing capacity. Accordingly, power consumption used per time by the cell-balancing in the balancing channels (CH1, CH3, CH5, CH7, and CH9) is the same irrespective of the balancing capacity. Therefore, discharging of the balancing channels (CH1, CH3, CH5, CH7, and CH9) is sequentially finished according to the balancing capacity, and a sum of power consumption consumed by the discharging in the balancing channels (CH1, CH3, CH5, CH7, and CH9) also sequentially reduces.

Therefore, in designing a cell-balancing circuit, it may be useful to design a discharging current in anticipation of power consumption under the worst condition for performing a discharging for all of the cells to be simultaneously balanced. Because of this consideration, there is a limit in increasing the balancing current for reducing the cell-balancing time.

A cell-balancing method according to embodiments of the present disclosure and a battery management system for performing the same will now be described with reference to drawings.

FIG. 2 to FIG. 5 show examples of a battery pack for performing a cell-balancing method according to embodiments of the present disclosure.

Referring to FIG. 2 to FIG. 5, battery packs 10a, 10b, 10c, and 10d may include a battery module 100 and a battery management system (BMS).

The battery module 100 may include a plurality of cells connected in series to each other.

The battery management system controls the battery packs 10a, 10b, 10c, and 10d, and may include a battery integrated circuit (IC) 200 and a battery controller 300.

The battery IC 200 may detect a cell voltage, a charging and discharging current, a temperature of each cell configuring the battery module 100, and may control the cell-balancing on the battery module 100. The battery IC 200 may include an analog front end (AFE) IC and a cell voltage monitoring (CVM) IC of the battery.

The battery IC 200 may include balancing switches (SWb) and a battery monitoring circuit 210 for performing voltage detection, cell-balancing control, and the like for the battery module 100.

The battery monitoring circuit 210 includes a voltage-detecting circuit, and through may detect a cell voltage of each cell configuring the battery module 100. The voltage-detecting circuit is connected to respective ends of the corresponding cell through two input terminals (Cin) and two filter resistors (Rf), and it may detect the cell voltage of the corresponding cell.

When a cell voltage is detected, the battery monitoring circuit 210 transmits the cell voltage to the battery controller 300. Upon receiving a cell-voltage-detecting result from the battery monitoring circuit 210, the battery controller 300 may control a cell-balancing and a charging/discharging of the battery module 100 based on the cell-voltage-detection result.

The battery packs 10a, 10b, 10c, and 10d may include a cell-balancing circuit for controlling a balancing among the cells configuring the battery module 100. In embodiments of the present disclosure, the cell-balancing of the battery module 100 is performed in a passive way, and the cell-balancing circuit may include resistors for forming a discharging path for cell-balancing of the cells, balancing switches for opening and closing the discharging paths of the cells, and a battery monitoring circuit 210 for controlling the balancing switches based on cell-balancing control information provided by the battery controller 300.

Figure 2:
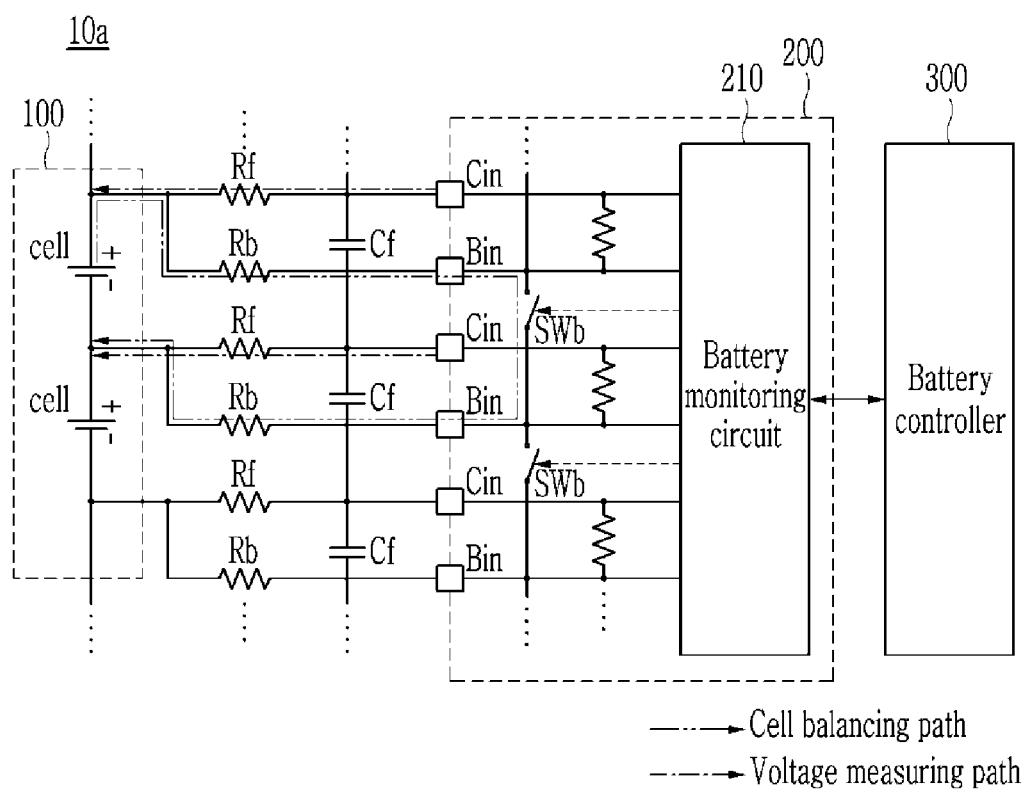
FIG. 2 to FIG. 5 show examples of a battery pack for performing a cell-balancing method according to an embodiment of the present disclosure.

For example with reference to FIG. 2, the cell-balancing circuit includes, for each cell, two balancing resistors (Rb) respectively connected between ends of a corresponding cell and the balancing terminals (Bin) and forming a discharging path, and a balancing switch (SWb) for allowing or blocking a cell-balancing current flow of the corresponding cell according to control by the battery monitoring circuit 210. The balancing switch (SWb) is connected between the two balancing resistors (Rb) through the balancing terminals (Bin), and is connected between the ends of the corresponding cell through the two balancing resistors (Rb). Accordingly, when the balancing switch (SWb) is turned on, the balancing current flows through the balancing resistors (Rb) respectively connected to the ends of the corresponding cell to perform a discharging of the corresponding cell. On the contrary, when the balancing switch (SWb) is turned off, the discharging path is blocked to thus block the balancing current flow of the corresponding cell.

In the cell-balancing circuit shown with reference to FIG. 2, the balancing terminals (Bin) respectively connected to the ends of the cells are formed separately from the input terminals (Cin) for voltage detection, so a voltage detecting path of each cell is separated from the discharging path for a cell-balancing of each cell. The discharging path for two adjacent (or neighboring) cells may be partly shared by sharing the balancing terminal (Bin). Accordingly, the battery pack 10a may perform a cell-balancing by dividing the cells configuring the battery module 100 into an even-numbered group and an odd-numbered group, and by alternately turning on the balancing switches (SWb) of the even-numbered group and the balancing switches (SWb) of the odd-numbered group.

Figure 3:
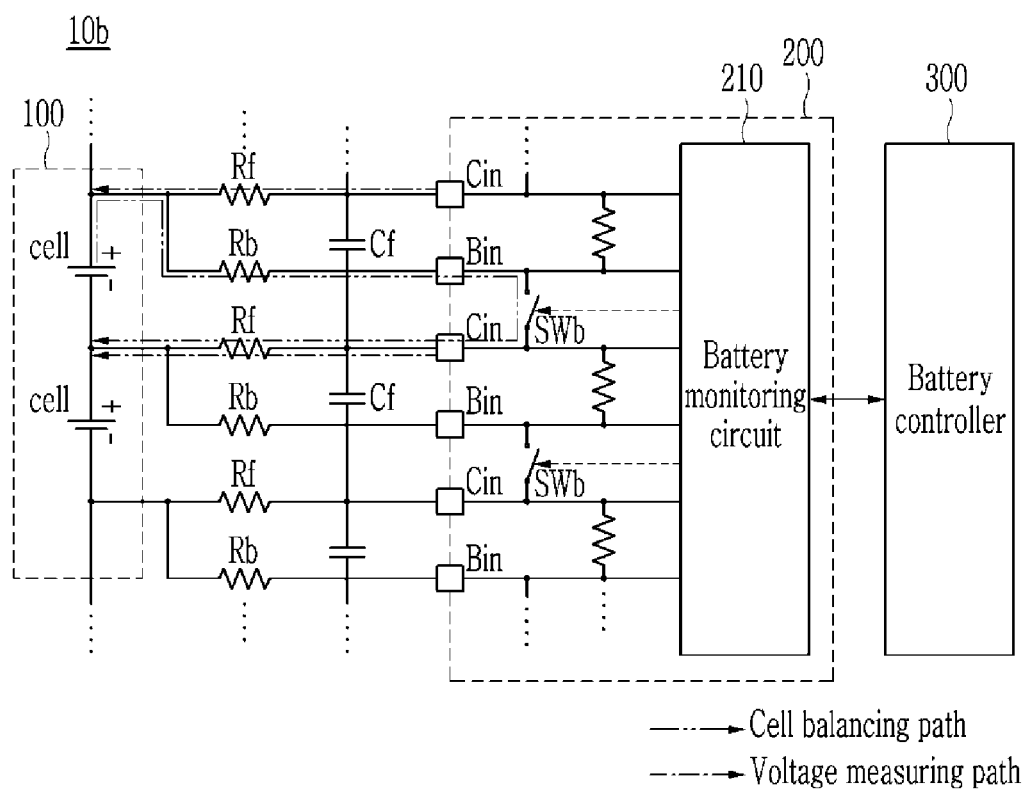

For example with reference to FIG. 3, the cell-balancing circuit includes, for each cell, a balancing resistor (Rb) connected between a positive electrode of a corresponding cell and the balancing terminal (Bin), a filter resistor (Rf) connected between a negative electrode of the corresponding cell and an input terminal (Cin), and a balancing switch (SWb) for allowing or blocking the cell-balancing current flow of the corresponding cell according to control by the battery monitoring circuit 210.

The balancing switch (SWb) is connected between two corresponding balancing terminals (Bin). Further, when the balancing switch SWb is closed, each balancing terminal (Bin) is connected to both ends of a corresponding cell (e.g., through the balancing resistor (Rb) connected to the positive electrode of the corresponding cell and the filter resistor (Rf) connected to the negative electrode of the corresponding cell). Accordingly, when the balancing switch (SWb) is turned on, the balancing current flows through the balancing resistor (Rb) and the filter resistor (Rf) connected to both ends of the corresponding cell to thus progress a discharging of the corresponding cell.

In the cell-balancing circuit shown with reference to FIG. 3, a voltage detecting path/voltage measuring path and a cell-balancing discharging path/cell balancing path of each cell share one filter resistor (Rf) and one input terminal (Cin). Also, the balancing terminal (Bin) is not shared between the cells, so cell-balancing may be independently performed for each cell.

Figure 4:
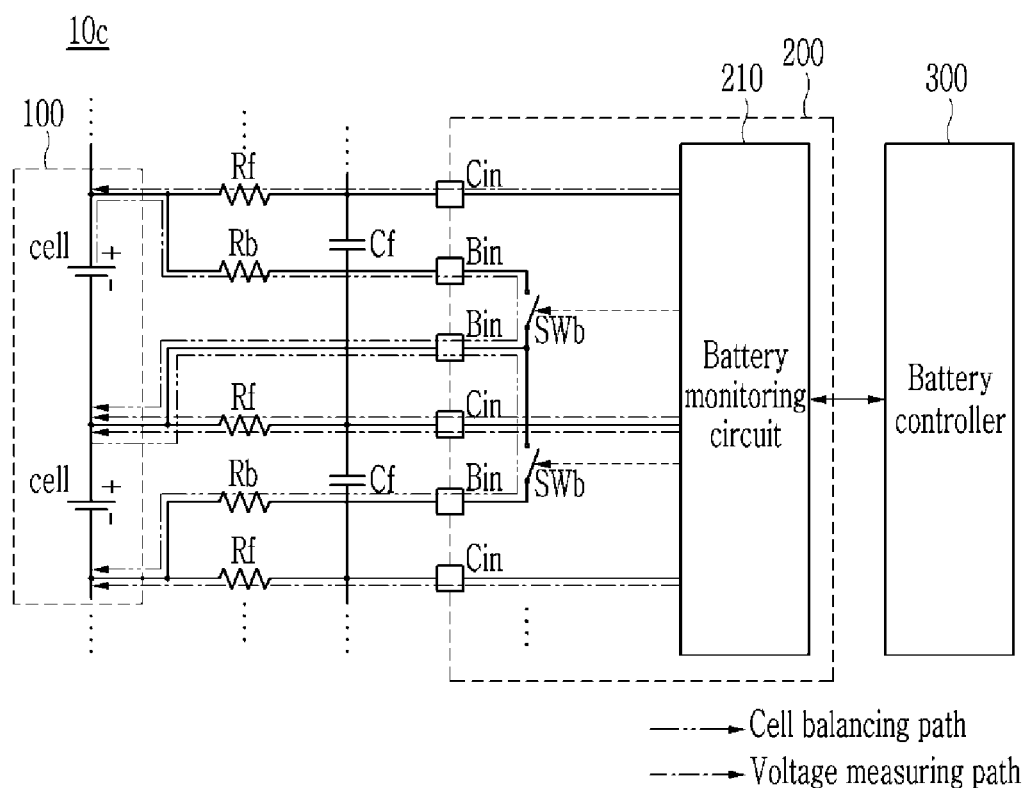

For example, with reference to FIG. 4, the cell-balancing circuit includes, for each cell, a balancing resistor (Rb) connected between an electrode of a corresponding cell, and the balancing terminal (Bin) and a balancing switch (SWb) for allowing or blocking the cell-balancing current flow of the corresponding cell according to control by the battery monitoring circuit 210. The balancing switch (SWb) is connected between two balancing terminals (Bin). Further, one of the two balancing terminals (Bin) is connected to an electrode of the corresponding cell through the balancing resistor (Rb), and the other balancing terminal (Bin) is connected to the other electrode of the corresponding cell. Accordingly, when the balancing switch (SWb) is turned on, the balancing current flows through the balancing resistor (Rb) connected to one of the respective ends of the corresponding cell to thus progress a discharging of the corresponding cell.

In the cell-balancing circuit shown with reference to FIG. 4, the balancing terminals (Bin) connected to the ends of each cell exist separately from the input terminals (Cin) for voltage detection, and thereby a voltage detecting path and a cell-balancing discharging path for each cell are separated. In other embodiments, the balancing terminal (Bin) is partly shared by two adjacent cells.

Figure 5:
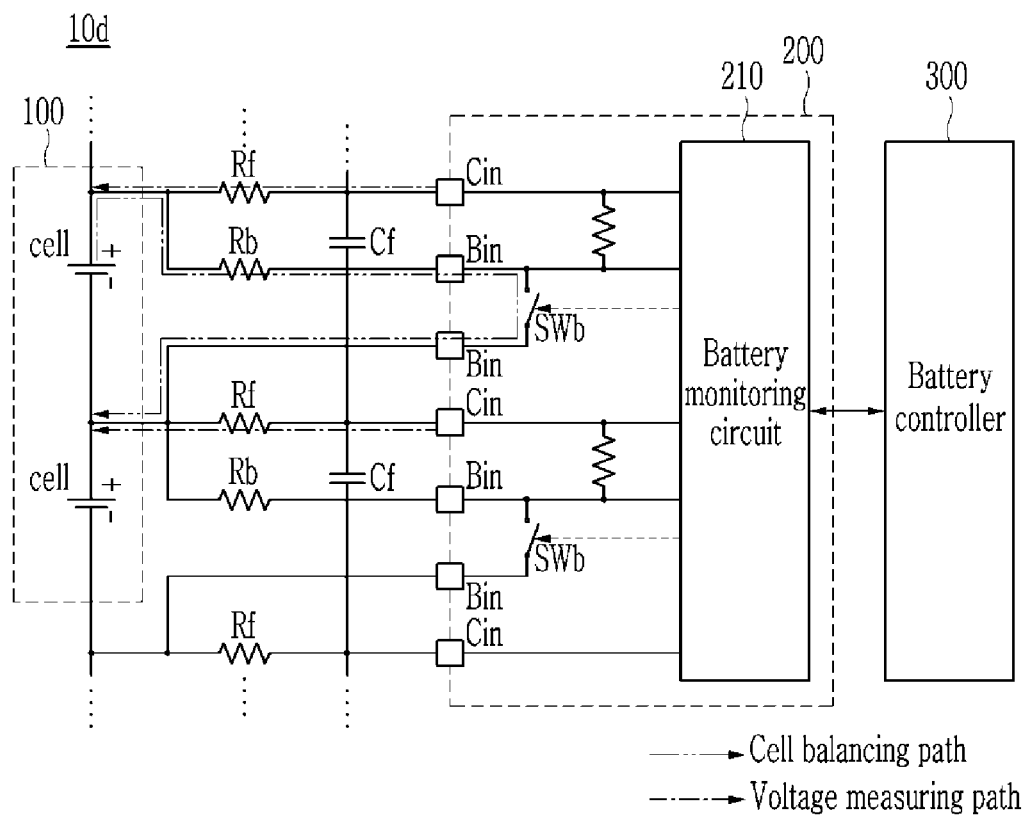

For example with reference to FIG. 5, the cell-balancing circuit includes, for each cell, a balancing resistor (Rb) connected between an electrode of a corresponding cell, and both the balancing terminal (Bin) and a balancing switch (SWb) for allowing or blocking the cell-balancing current flow of the corresponding cell according to control by the battery monitoring circuit 210. The balancing switch (SWb) is connected between two balancing terminals (Bin). Further, one of the two balancing terminals (Bin) is connected to one electrode of the corresponding cell through the balancing resistor (Rb), and the other balancing terminal (Bin) is connected to the other electrode of the corresponding cell. Accordingly, when the balancing switch (SWb) is turned on, the balancing current flows through the balancing resistor (Rb) connected to an electrode of the corresponding cell to thus progress a discharging of the corresponding cell.

In the cell-balancing circuit of FIG. 5, the balancing terminals (Bin) connected to both ends of each cell exist separately from the input terminals (Cin) for voltage detection, and thereby a voltage detecting path and a cell-balancing discharging path for each cell are separated. Further, the balancing terminals (Bin) for each cell are independently provided.

Regarding FIG. 2 to FIG. 5, the balancing switch (SWb) may be configured with field effect transistors (FET).

FIG. 2 to FIG. 5 depict the case in which balancing switches (SWb) are included in a battery IC 200. However, an embodiment of the present disclosure is not limited thereto, and the balancing switches (SWb) may be located outside the battery IC 200.

A cell-balancing method according to embodiments of the present disclosure will now be described with reference to accompanying drawings. Embodiments of the present disclosure described below may be performed by the battery packs (e.g., battery controller 300 and battery IC 200) described with reference to FIG. 2 to FIG. 5.

A cell-balancing method according to a first embodiment of the present disclosure will now be described with reference to FIG. 6 to FIG. 8.

Figure 6:
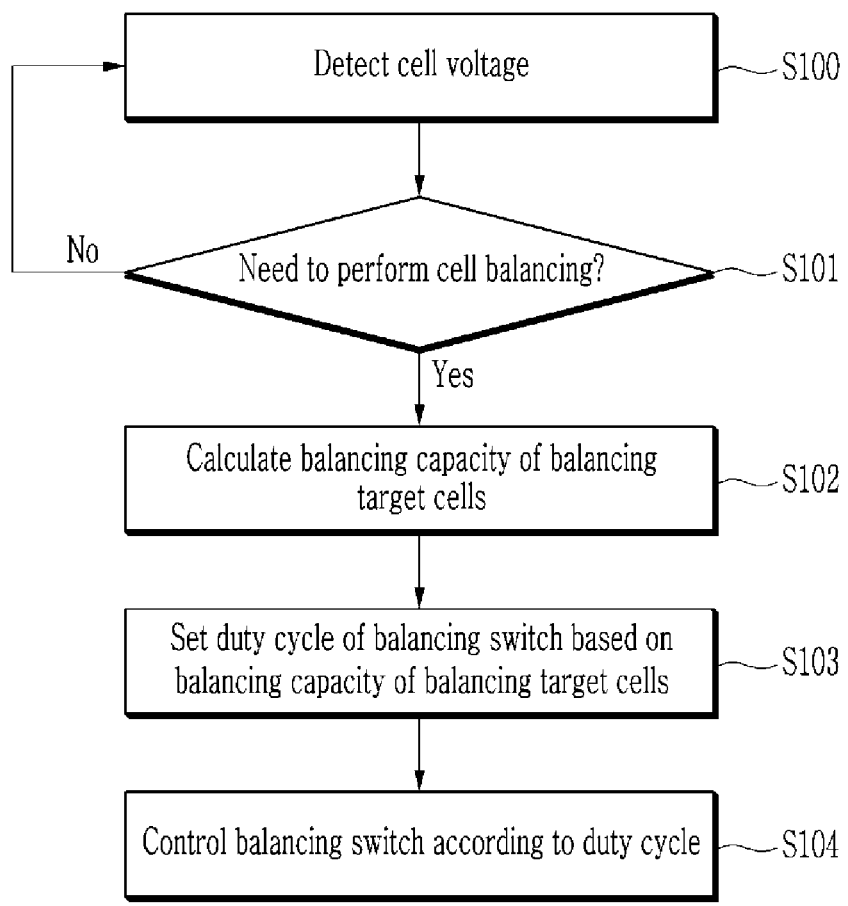
FIG. 6 shows a cell-balancing method according to a first embodiment of the present disclosure.
Figure 9:
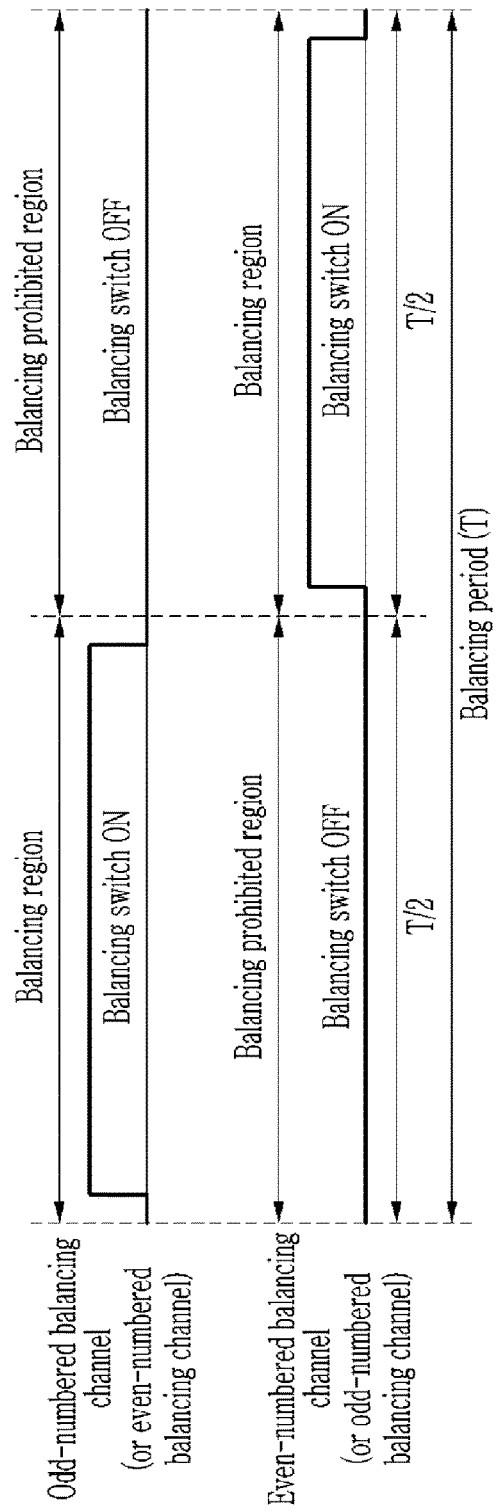
FIG. 9 shows an example of a related art cell-balancing control timing diagram.
Figure 10:
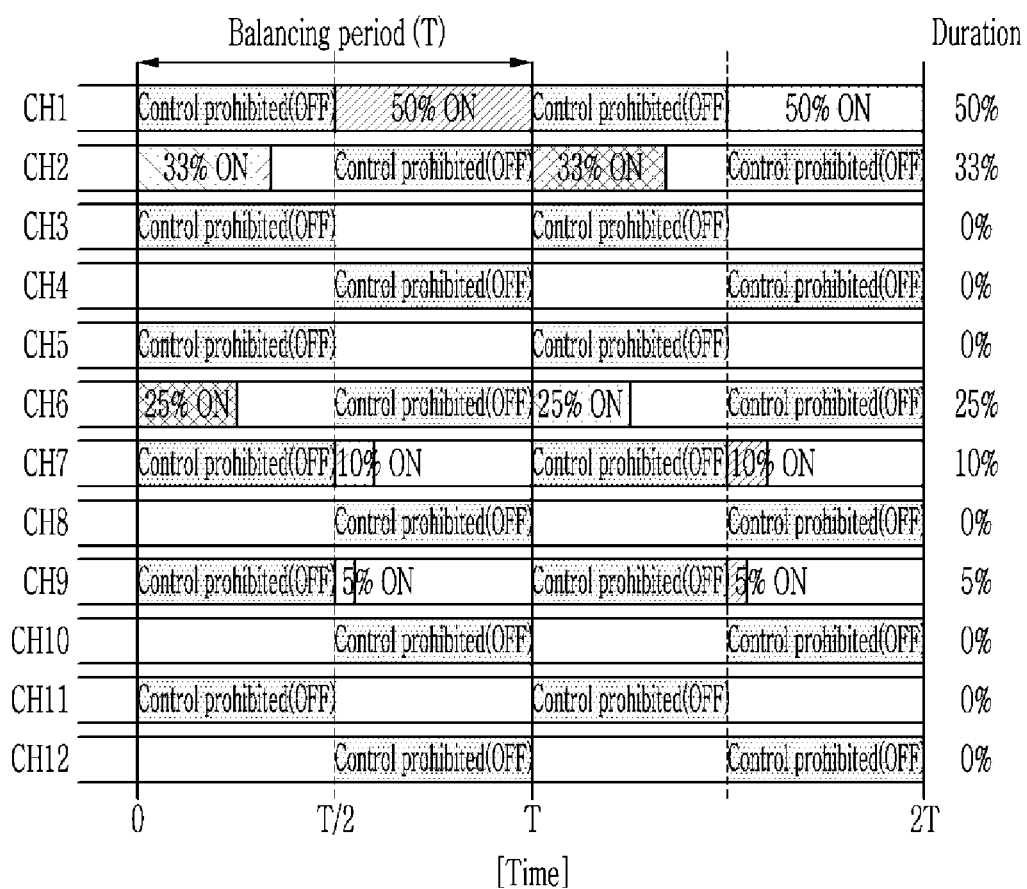
FIG. 10 shows an example of a cell-balancing control timing diagram when a cell-balancing method according to a first embodiment of the present disclosure is applied.

FIG. 6 shows a cell-balancing method according to a first embodiment of the present disclosure. FIG. 7 and FIG. 8 show examples of balancing capacity and a changing trend of average balancing current/power when a cell-balancing control method according to a first embodiment of the present disclosure is used. FIG. 9 shows an example of a related art cell-balancing control timing diagram, and FIG. 10 shows an example of a cell-balancing control timing diagram when a cell-balancing method according to a first embodiment of the present disclosure is applied.

Referring to FIG. 6, according to a first embodiment of the present disclosure, the battery packs 10a, 10b, and 10c periodically detect a cell voltage of each cell configuring the battery module 100 through the battery IC 200 (S100).

In S100, the battery IC 200 includes a voltage-detecting circuit, and it may detect the cell voltage of each cell through the same.

The cell voltage detected by the battery IC 200 is transmitted to the battery controller 300, and based on this, the battery controller 300 determines whether a cell-balancing on the battery module 100 is warranted (S101).

When the cell-balancing is determined to be warranted, the battery controller 300 calculates balancing capacity of each cell subject to balancing (referred to as a balancing target cell, hereinafter) based on the cell voltage of each cell (S102).

In S102, the battery controller 300 may calculate an average cell voltage on the cells configuring the battery module 100, and may calculate balancing capacity of each cell from a respective difference between the calculated average cell voltage and the cell voltage of each cell.

The battery controller 300, when the balancing capacity for each the balancing target cell is calculated, sets a duty cycle of the corresponding balancing switch (SWb) based on the calculated balancing capacity (S103). In the present specification, the duty cycle of the balancing switch (SWb) may mean the ratio of a turn-on time of the balancing switch to the sum of the turn-on time and a turn-off time of the (SWb), and may mean the ratio of duration in which the balancing switch (SWb) is turned on within one balancing cycle.

The duty cycle calculated for each balancing switch (SWb) is included in cell-balancing control information, and is then transmitted to the battery IC 200. The battery IC 200 controls the turn-on/off of the balancing switch (SWb) (S104) based on the duty cycle for each balancing switch (SWb). In this instance, when the balancing switch (SWb) is pulse-driven, the average balancing current/power of the corresponding discharging path is proportional to the duty cycle of the switch (SWb).

In S103, the battery controller 300 may set the duty cycle of the balancing switch (SWb) corresponding to each balancing target cell based on the ratio(s) of balancing capacities of the balancing target cells.

Figure 7:
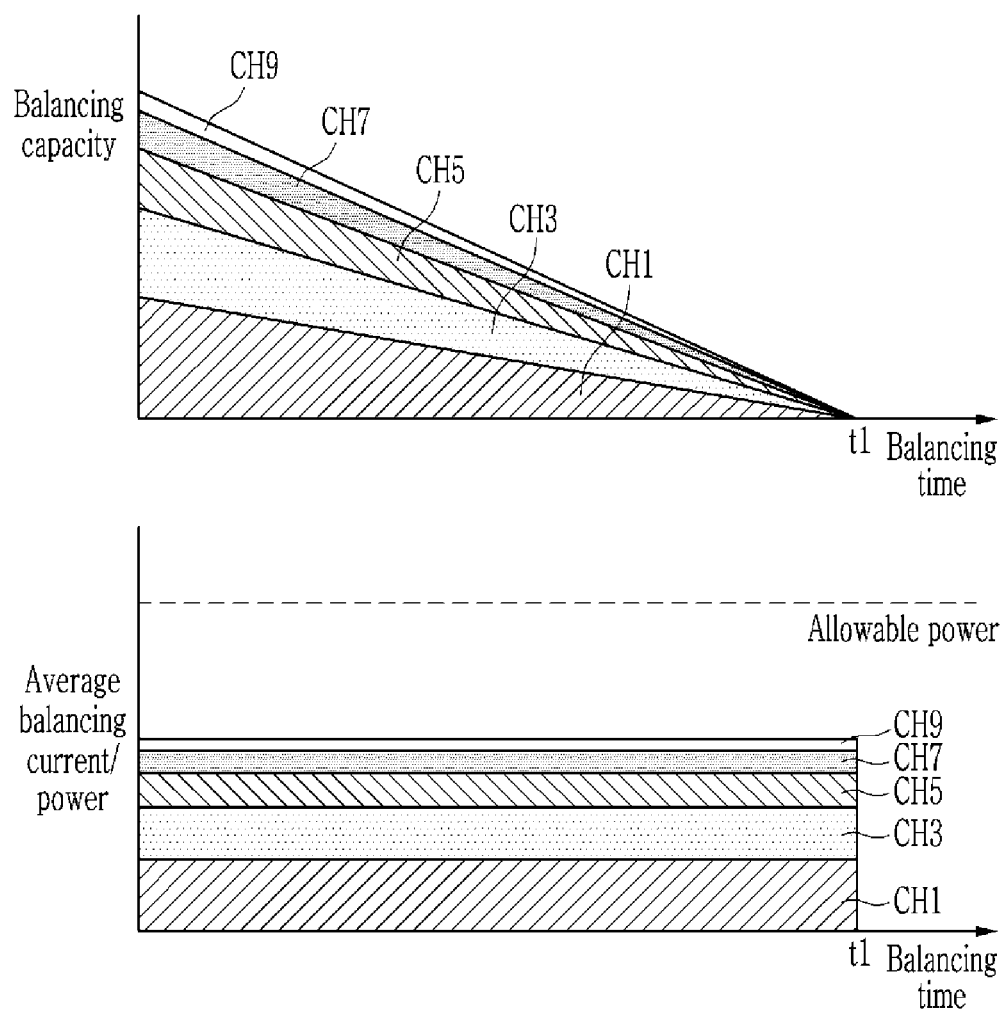
FIG. 7 and FIG. 8 show examples of balancing capacity and a changing trend of average balancing current/power when a cell-balancing control method according to a first embodiment of the present disclosure is used.
Figure 8:
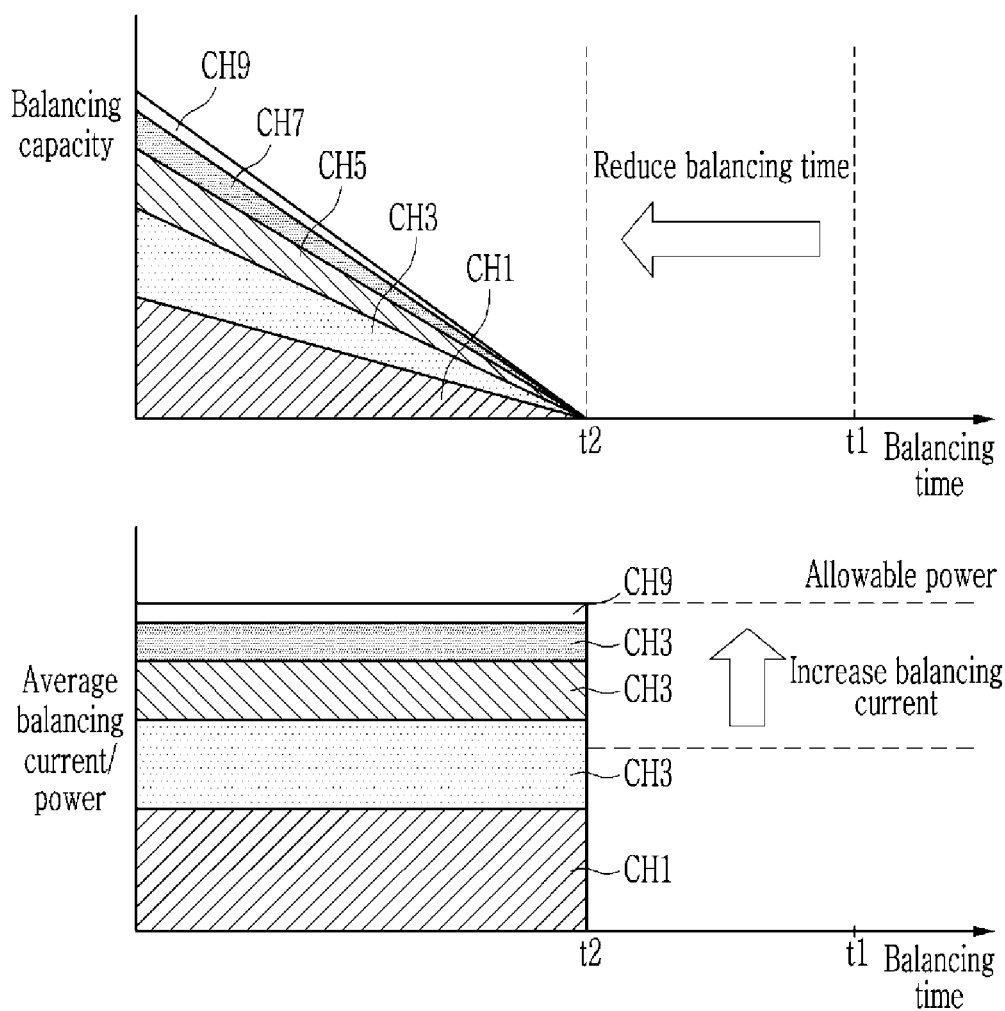

FIG. 7 and FIG. 8 show balancing capacity when a duty cycle of a balancing switch is controlled according to balancing capacity, and a changing trend of average balancing current/power.

For example with reference to FIG. 7, the duty cycle of the balancing switch (SWb) configuring the balancing channels CH1, CH3, CH5, CH7, and CH9 is set corresponding to the balancing capacity ratio of the corresponding balancing target cell. That is, the battery controller 300 sets respective ratios of balancing capacities of the balancing target cells and the respective ratios of duty cycles of corresponding balancing switches (SWb) to be substantially identical. When set as described, the balancing channels CH1, CH3, CH5, CH7, and CH9 concurrently starting a cell-balancing may have a substantially identical balancing finishing time. Further, the sum of power consumption used by the cell-balancing in all of the balancing channels (balancing target cells) is maintained until the cell-balancing finishes, and increased or maximum power consumption caused by the cell-balancing also is reduced by the average power consumption.

Hereinafter, by exemplifying the case in which the ratio of balancing capacity of three balancing target cells A, B, and C is A:B:C=1:0.5:0.2, and the balancing current in each balancing channel is IA, an effect of reducing maximum power consumption in the case of setting the duty cycle of the balancing switch based on balancing capacity will be described in detail.

When the duty cycle of the balancing target cells A, B, and C is set to be $D_{CA}:D_{CB}:D_{CC}=1:0.5:0.2$ like the ratio of balancing capacity according to the method shown with reference to FIG. 7, the average balancing current of the balancing target cells A, B, and C compared to the maximum balancing current becomes A=IA, B=0.5IA, and C=0.2IA. Further, the average power consumed by the balancing resistor (R) of each balancing channel becomes $P_A=(IA)^2 \times R$, $P_B=(0.5IA)^2 \times R$, and $P_C=(0.2IA)^2 \times R$. Therefore, the sum of power consumption used by the cell-balancing in the three balancing target cells A, B, and C becomes $P_{total}=P_A+P_B+P_C=(IA)^2 \times R$ $(0.5IA)^2 \times R+(0.2IA)^2 \times R=(1+0.25+0.04) \times (IA)^2 \times R=1.29 \times (IA)^2 \times R$.

When the cell-balancing method described with reference to FIG. 1 is applied to the same case, the same balancing current (IA) flows to the balancing target cells A, B, and C such that power consumption used by the balancing resistor (R) becomes $P_A=P_B=P_C=(IA)^2 \times R$. In this instance, the balancing target cells A, B, and C have different balancing capacities such that the cell-balancing finishing time of the balancing target cells A, B, and C, and the sum of power consumption caused by the cell-balancing of the balancing target cells A, B, and C gradually reduces each time the cell-balancing on one of the balancing target cells finishes.

For example, the sum of power consumption caused by the cell-balancing when the balancing starts is $P_{total}=3\times(IA)^2\times R$, the sum of power consumption caused by the cell-balancing after the balancing on the cell C finishes is $P_{total}=2\times(IA)^2\times R$, the sum of power consumption caused by the cell-balancing after the cell-balancing on the cell B finishes is $P_{total}=(IA)^2\times R$, and when the cell-balancing on the cell A finishes, the cell-balancing on the balancing target cells ends.

In comparison of the above-noted two cases, as shown in FIG. 7, power consumption in the case of controlling the duty cycle of the balancing switch according to the ratio of balancing capacity is constant to be $P_{total}=1.29\times(IA)^2\times R$, and power consumption in the case of performing a cell-balancing without controlling the duty cycle as shown in FIG. 1 is $P_{total}=3\times(IA)^2\times R$ to the maximum when the cell-balancing starts, and it gradually reduces as the cell-balancing progresses. In comparison of the maximum power consumption of the above-noted two cases, when the duty cycle of the balancing switch is controlled according to the ratio of balancing capacity, the maximum power consumption reduces to about 43% in the case of performing a cell-balancing without controlling the duty cycle.

Therefore, in a first embodiment of the present disclosure, as shown in FIG. 8, the discharging current for a cell-balancing may be increased so that power consumption caused by a cell-balancing may increase to an allowable power considering radiation performance of the substrate on which a cell-balancing circuit is mounted such that the balancing time may be reduced.

Assuming that allowable power in consideration of radiation performance of the substrate is $3\times(IA)^2\times R$, when the present balancing current is IA and the allowable balancing current is IB, it becomes that $1.29\times(IB)^2\times R=3\times(IA)^2\times R$ and $$\frac{IB}{IA}=\sqrt{\frac{3}{1.29}}\cong 1.44,$$

so IA may be allowed to increase up to IB=1.44×IA.

The battery pack 10a shown in FIG. 2 has a configuration such that it shares a balancing terminal (Bin) among adjacent (or neighboring) cells, and the balancing switches (SWb) might not be simultaneously turned on for the adjacent cells sharing the balancing terminal (Bin).

Regarding the above-configured conventional battery pack 10a, as shown in FIG. 9, the cell-balancing is performed by distinguishing the cells configuring the battery module 100 into an even-numbered group and an odd-numbered group, and by alternately turning on the balancing switches (SWb) of the even-numbered group and the balancing switches (SWb) of the odd-numbered group. In this instance, a section in which the balancing switches (SWb) of the odd-numbered cell group and the balancing switches (SWb) of the even-numbered cell group are turned on/off is fixed. Accordingly, in a section in which the balancing switches (SWb) of one of the groups are turned on, the balancing switches (SWb) of the other group may be maintained to be turned off.

As described, when the cell-balancing method according to a first embodiment of the present disclosure is applied to the battery pack (e.g., the battery pack 10a shown in FIG. 2) for performing a cell-balancing by alternately performing a balancing to adjacent cells, and when the greatest balancing capacity ($Q_b$) calculated for the respective balancing target cells is denoted as $Q_{b\_max}$, the duty cycle ($D_{Ci}$) of the balancing switch (SWb) corresponding to each the balancing target cell may be expressed as in Equation 1.

$$D_{Ci}=Q_b/Q_{b\_max}\times 50\% \qquad \text{Equation 1}$$

When the balancing current flowing through the corresponding discharging path for the duration corresponding to the duty cycle ($D_{Ci}$) is given as $I_b$, the average balancing current ($I_{b\_ave}$) flowing through the discharging path of the balancing target cell in one balancing cycle (T) may be given as like in Equation 2.

$$I_{b\_ave}=I_b\times D_{Ci} \qquad \text{Equation 2}$$

Further, the balancing current amount ($I_{total}$) actually discharged in the total balancing time ($T_b$) is expressed in Equation 3.

$$I_{total}=I_{b\_ave}\times T_b \qquad \text{Equation 3}$$

Referring to Equations 1 to 3, the total balancing time ($T_b$) may be calculated by using Equation 4.

$$T_b=I_{total}/I_{b\_ave}=I_{total}/(I_b\times D_{Ci})=I_{total}/(I_b\times(Q_b/Q_{b\_max}\times 50\%)) \qquad \text{Equation 4}$$

Also, the discharging amount performed within the balancing time ($T_b$) is designed for the purpose of balancing capacity ($Q_b$), so Equation 4 may be changed into Equation 5.

$$T_b=Q_{b\_max}/(I_b\times 50\%) \qquad \text{Equation 5}$$

Referring to Equation 5, the balancing time ($T_b$) may be determined by the values of $Q_{b\_max}$ and $I_b$ regarding all of the balancing target cells (e.g., balancing channels).

FIG. 10 illustrates a timing diagram when a cell-balancing is performed according to a method described with reference to Equations 1 to 5.

Referring to FIG. 10, the total balancing time ($T_b$) on the balancing target cells is determined by the duty cycle ($D_{Ci}$) of a balancing channel CH1 with the maximum balancing capacity. However, the cell-balancing is alternately performed by the odd-numbered discharging channel and the even-numbered discharging channel, so the cell-balancing efficiency may be limited.

To solve the above-noted problem, in the cell-balancing method according to a second embodiment of the present disclosure, while the duty cycle of the balancing switches (SWb) is based on the balancing capacity ratio among the balancing target cells, the duty cycle of the balancing switches (SWb) is scaled so that sums of duty cycles of the two adjacent cells may be less than or equal to a maximum of 100%. Therefore, one balancing on one of two adjacent cells is turned on while the balancing of the other is turned off to prevent two adjacent cells from simultaneously being turned on. Accordingly, it becomes possible to set the duty cycle of one cell to be greater than 50% through a duty scaling, thereby increasing the cell-balancing efficiency.

A cell-balancing method according to a second embodiment of the present disclosure will now be described in detail with reference to FIG. 11 to FIG. 14.

Figure 11:
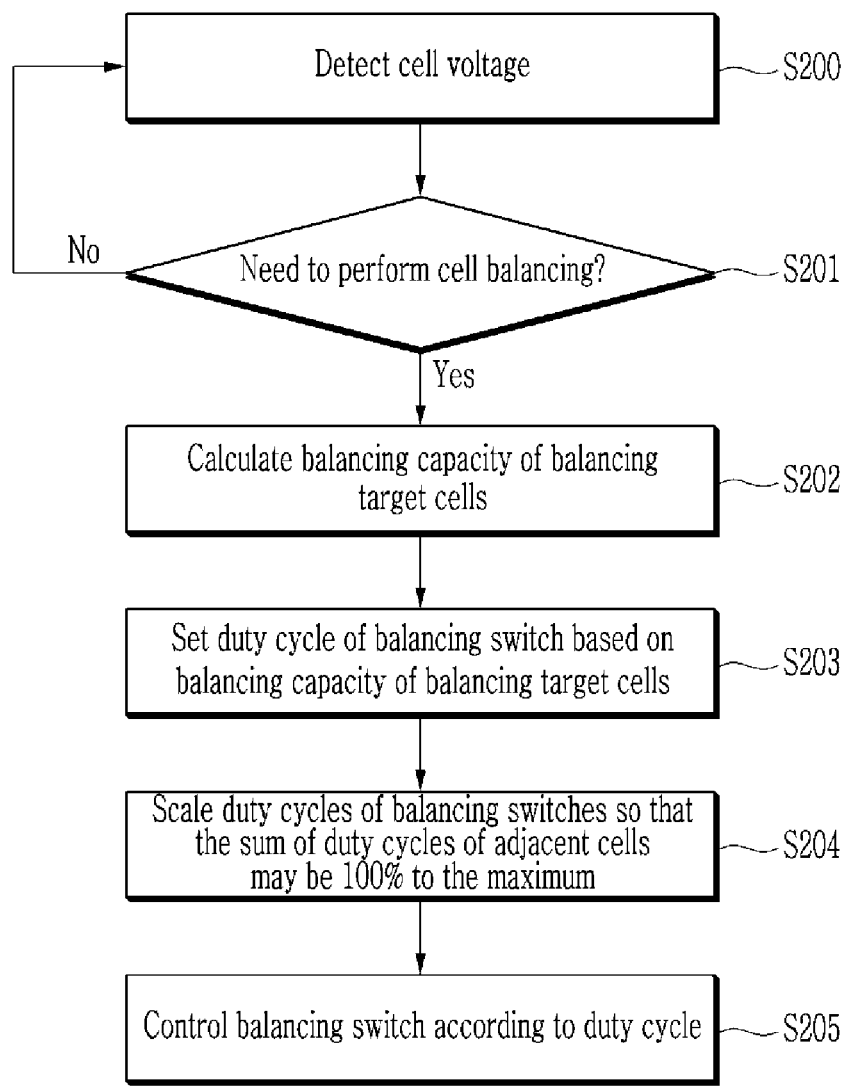
FIG. 11 shows a cell-balancing method according to a second embodiment of the present disclosure.

FIG. 11 shows a cell-balancing method according to a second embodiment of the present disclosure.

Referring to FIG. 11, according to a second embodiment of the present disclosure, the battery packs 10a, 10b, and 10c periodically detect cell voltages of the respective cells for configuring the battery module 100 through the battery IC 200 (S200).

The cell voltage detected by the battery IC 200 is transmitted to the battery controller 300, and the battery controller 300 determines whether a cell-balancing on the battery module 100 is warranted (S201).

The battery controller 300, when it is determined that a cell-balancing is warranted, calculates the balancing capacity of the respective balancing target cells subject to a balancing based on the cell voltages of the cells (S202).

The battery controller 300, when balancing capacity on the respective balancing target cells is calculated, sets the duty cycle of the corresponding balancing switch (SWb) based on the calculated balancing capacity (S203).

In S203, the battery controller 300 may set the ratio of balancing capacity of the balancing target cells and the ratio of the duty cycle of the balancing switch (SWb) corresponding to the balancing target cells to be substantially identical.

When the duty cycle of the balancing switches (SWb) is set based on the balancing capacity ratio among the balancing target cells, the battery controller 300 scales the duty cycle of the balancing switches (SWb) so that the sum of the duty cycles of two adjacent cells may be less than or equal to a maximum of 100% (S204).

The duty cycle scales corresponding to S204 may be included in cell-balancing control information and may be transmitted to the battery IC 200, and the battery IC 200 controls turn-on/off of the balancing switches (SWb) according to the duty cycle (S205).

A method for scaling duty cycles of balancing switches (SWb) in S204 will now be described in detail.

Figure 12:
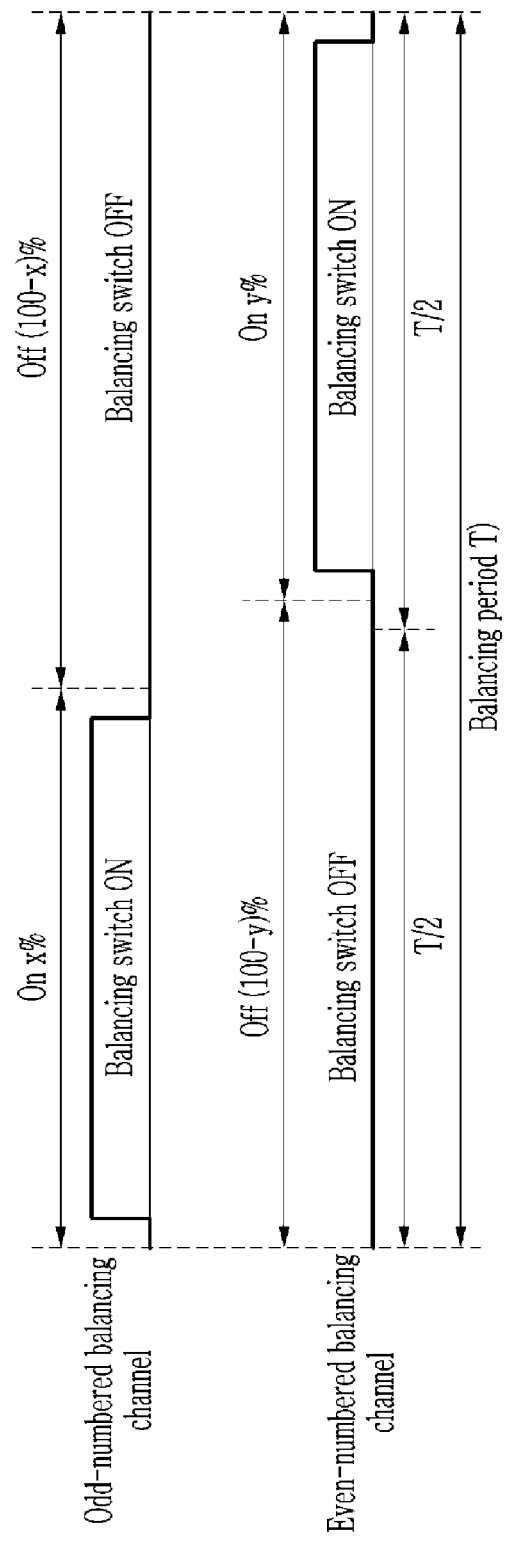
FIG. 12 and FIG. 13 show a basic concept of a duty scaling in a cell-balancing method according to a second embodiment of the present disclosure.
Figure 13:
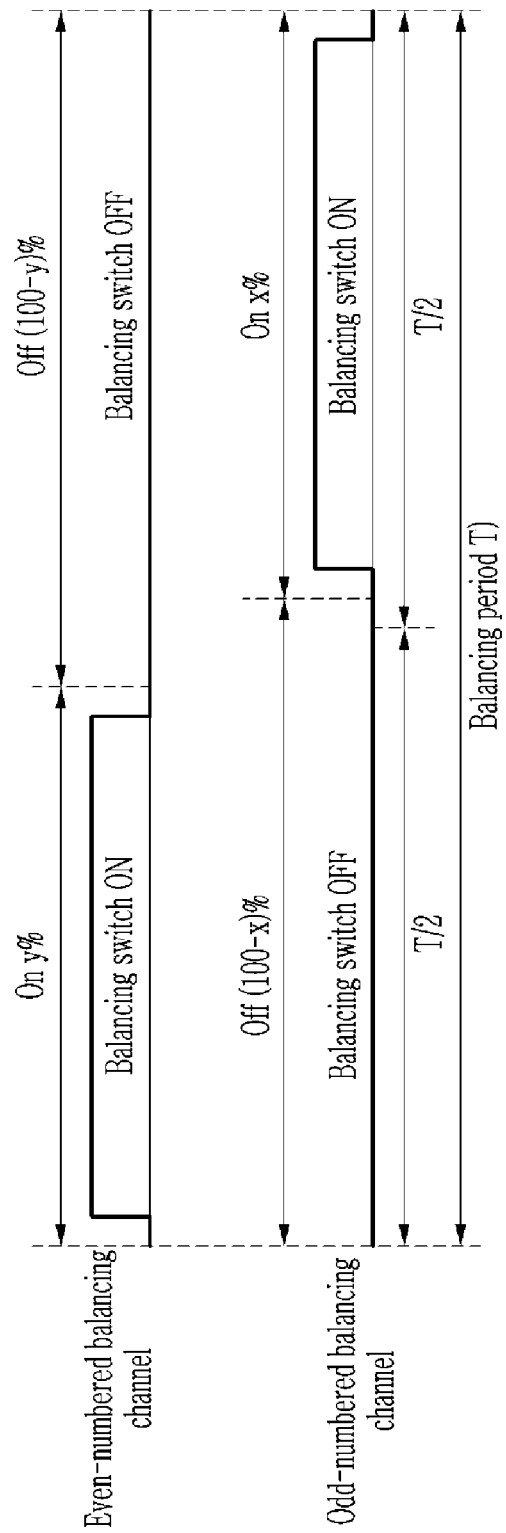

FIG. 12 and FIG. 13 show a basic concept of a duty scaling in a cell-balancing method according to a second embodiment of the present disclosure.

Referring to FIG. 12 and FIG. 13, according to a second embodiment of the present disclosure, a plurality of cells configuring the battery module 100 are divided into an odd-numbered cell group and an even-numbered cell group. In FIG. 12 and FIG. 13, the discharging path of the balancing target cell included in the odd-numbered cell group is denoted to be an odd-numbered balancing channel, and the discharging path of the balancing target cell included in the even-numbered cell group is denoted to be an even-numbered balancing channel.

Referring to FIG. 12, when the duty cycle of the balancing switch (SWb) for the odd-numbered balancing channel is defined to be x (%), the balancing switch (SWb) maintains the turn-on state for the duration corresponding to the duty cycle (x (%)) regarding the odd-numbered balancing channel, and the balancing switch (SWb) maintains the turn-off state for the period of 100–x (%) until the corresponding balancing cycle ends.

When the duty cycle of the balancing switch (SWb) for the even-numbered balancing channel is defined to be y (%), the balancing switch (SWb) is maintained at the turn-off state for the period of 100–y (%) of the balancing cycle regarding the even-numbered balancing channel, and the balancing switch (SWb) is maintained at the turn-on state for the duration corresponding to the duty cycle (y (%)).

Referring to FIG. 13, the balancing switch (SWb) is maintained at the turn-on state for the duration corresponding to the duty cycle (y (%)) regarding the even-numbered balancing channel, and the balancing switch (SWb) maintains the turn-off state for the period of 100–y (%) until the corresponding balancing cycle ends.

The balancing switch (SWb) is maintained at the turn-off state for the period of 100–x (%) of the balancing cycle regarding the odd-numbered balancing channel, and the balancing switch (SWb) is maintained at the turn-on state for the duration corresponding to the duty cycle (x (%)).

As shown in FIG. 12 and FIG. 13, when the cell-balancing of balancing channels is controlled, the sum (x+y) of the duty cycles of two adjacent cells may satisfy the condition of x+y≤100% so that the balancing switches (SWb) of the two adjacent cells may not be simultaneously turned on. Therefore, the cell-balancing method according to a second embodiment of the present disclosure scales the duty cycle of the balancing switches (SWb) in the range satisfying the limit condition.

When the maximum value from among balancing capacity ($Q_b$) of respective balancing target cells is defined to be $Q_{b\_max}$, the duty cycle ($D_{Ci}$) of the balancing switch (SWb) set corresponding to the balancing capacity ($Q_b$) may be expressed as in Equation 6.

$$D_{Ci}=(Q_b)/(Q_{b\_max})\times k \qquad \text{Equation 6}$$

In Equation 6, k may be set with a random value, and it may be set to be 50% for the purpose of comparison with a related art example.

The summation value ($D_{CiCj}$) of the duty cycles for each of cell combinations composed of two adjacent cells (i, j) based on Equation 6 may be expressed in Equation 7.

$$D_{CiCj}=D_{Ci}+D_{Cj} \qquad \text{Equation 7}$$

When the maximum value from among values $D_{CiCj}$ calculated through Equation 7 is defined to be $D_{CiCj\_max}$, and when a scale factor (w) is calculated so that the value may be 100%, (w) may be expressed as in Equation 8.

$$w=(100\%/D_{CiCj\_max}) \qquad \text{Equation 8}$$

When the scale factor (w) is calculated through Equation 8, the battery controller 300 multiplies the scale factor (w) and the duty cycle ($D_{Ci}$) of the balancing switches (SWb) calculated through Equation 6 to scale the duty cycle ($D_{Ci}$) of the balancing switches (SWb).

$$D_{Ci\_scale}=(Q_b)/(Q_{b\_max})\times 50\%\times w \qquad \text{Equation 9}$$

Equation 9 may be expressed as Equation 10.

$$D_{Ci\_scale}=(Q_b)/(Q_{b\_max})\times 50\%/D_{CiCj\_max} \qquad \text{Equation 10}$$

Referring to Equation 10, the duty cycle ($D_{Ci}$) of respective balancing target cells depends on the maximum summation value ($D_{CiCj\_max}$) of the duty cycles ($D_{Ci}$, $D_{Cj}$) between two adjacent cells.

When the maximum summation value ($D_{CiCj\_max}$) of the duty cycles ($D_{Ci}$, $D_{Cj}$) of two adjacent cells is 100%, and when two cells of which the duty cycles ($D_{Ci}$, $D_{Cj}$) are each the maximum value (50%) are adjacent to each other, the duty cycle ($D_{Ci\_scale}$) scaled by Equation 10 becomes substantially identical with the duty cycle Dc calculated through Equation 1 in a first embodiment of the present disclosure.

However, when one of the two adjacent cells has the duty cycle ($D_{Ci}$, $D_{Cj}$) that is not the maximum value (50%), $D_{Ci\_scale}$ scaled through Equation 10 may increase to be greater than $D_{Ci}$ calculated through Equation 1 in a first embodiment of the present disclosure.

Figure 14:
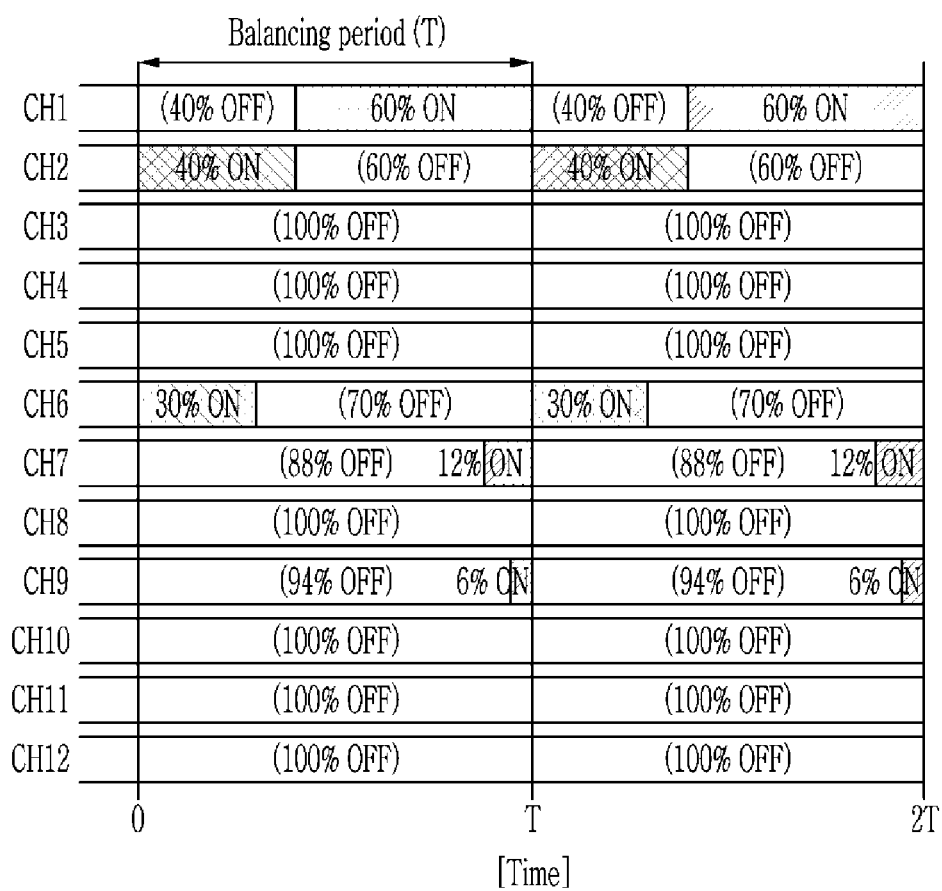
FIG. 14 shows a relationship between total balancing capacity of all balancing channels and a balancing time when a cell-balancing method according to a second embodiment of the present disclosure is applied.

FIG. 14 shows a relationship between total balancing capacity of all balancing channels and a balancing time when a cell-balancing method according to a second embodiment of the present disclosure is applied, exemplifying a case in which the battery module 100 includes twelve 37 Ah cells connected in series to each other and in which the balancing current ($I_b$) is 100 mA.

Referring to FIG. 14, when the cells with the most balancing capacity are adjacent to each other (Case 1), a discharging time becomes the case of performing a cell-balancing according to the existing method described with reference to FIG. 1 irrespective of balancing capacities of the remaining balancing target cells. However, regarding other cases (Case 2 and Case 3), the balancing time may be reduced corresponding to the maximum value from among the summation of balancing capacity among adjacent cells.

Figure 15:
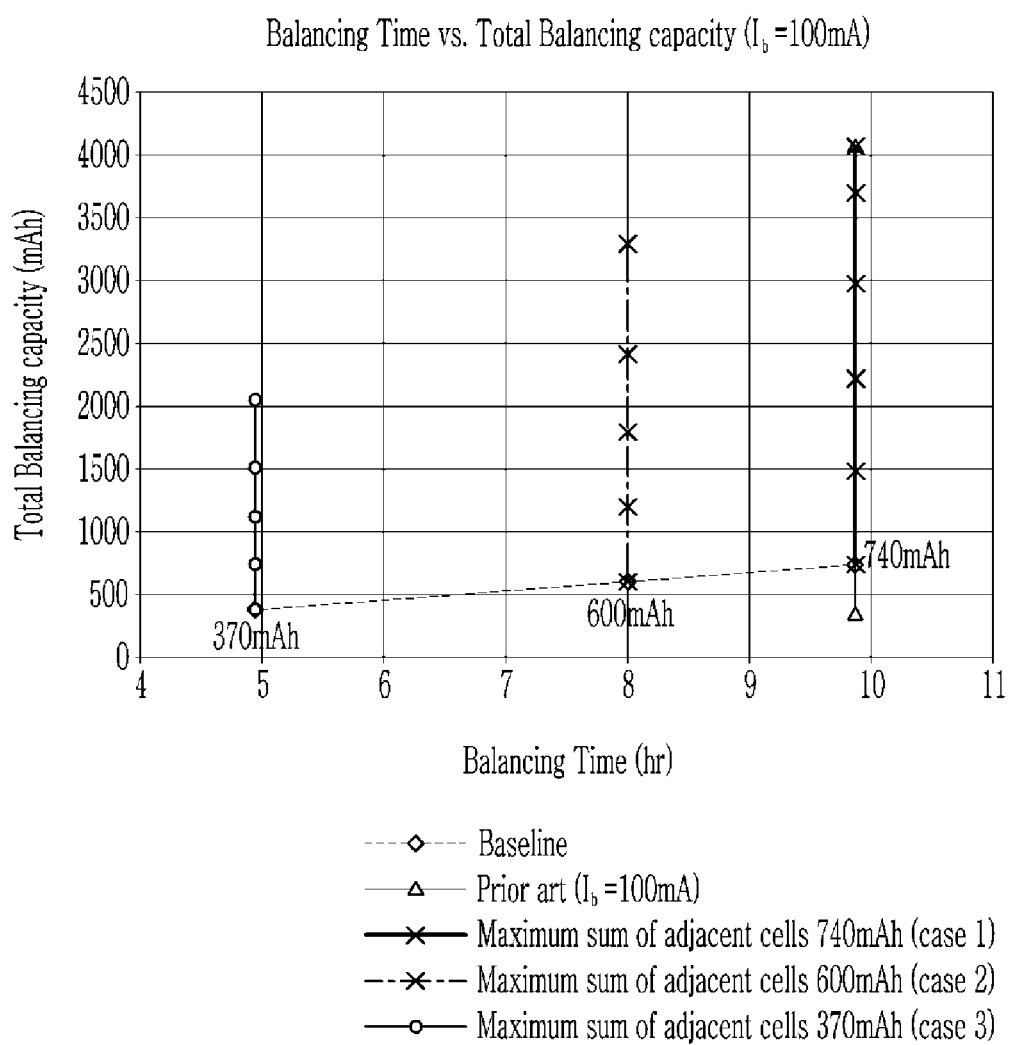
FIG. 15 shows an example of a case in which a duty scaling is applied to a timing diagram of FIG. 10.

FIG. 15 shows an example of a case in which a duty scaling is applied to a timing diagram of FIG. 10.

Referring to FIG. 15, the maximum summation value ($D_{CiCj\_max}$) of the duty cycles ($D_{Ci}$, $D_{Cj}$) between two adjacent cells in FIG. 10 is given as $D_{CiCj\_max}$=(33+50)%=83%, which is the summation of the duty cycles of balancing channels CH1 and CH2. When this is substituted into Equation 8, the scale factor (w) is determined as w=(100%/83%)=1.2.

As shown in FIG. 15, when the calculated scale factor (w=1.2) is applied to the duty cycles of the respective balancing channels shown in FIG. 10, the duty cycles of the balancing channels CH1, CH2, CH6, CH7, and CH9 increase to 60%, 40%, 30%, 12%, and 6% from 50%, 33%, 25%, 10%, and 5%, respectively. As described, when the cell-balancing is performed based on the scaled duty cycles, the average balancing current increases by 20% to thus reduce the balancing time by about 20% in comparison to the case of performing a cell-balancing based on the timing diagram shown in FIG. 10.

When the average balancing current is increased by increasing the balancing current or increasing the discharging efficiency according to first and second embodiment of the present disclosure, generation of heat by the balancing resistor may be an issue.

To solve the issue of heat generation, a cell-balancing method according to a third embodiment of the present disclosure described below may acquire the heat radiation performance of the substrate on which a cell-balancing circuit is located by managing power consumption of all of the balancing resistors in addition to individual power consumption of each balancing resistor.

Power generated by the balancing current generates heat by the balancing resistor, and the heat generated by the balancing resistor is mostly radiated through a wiring pattern of the substrate according to a thermal conduction method. Therefore, the configuration of the substrate provided around the balancing resistor or the wiring pattern may influence the heat radiation performance. The balancing resistors are close to each other on the actual substrate. Hence, the heat radiation performance of the substrate may be obtained by managing the power consumption of the balancing resistors in addition to individual power consumption of each balancing resistor.

A cell-balancing method according to a third embodiment of the present disclosure will now be described with reference to FIG. 16 and FIG. 17.

Figure 16:
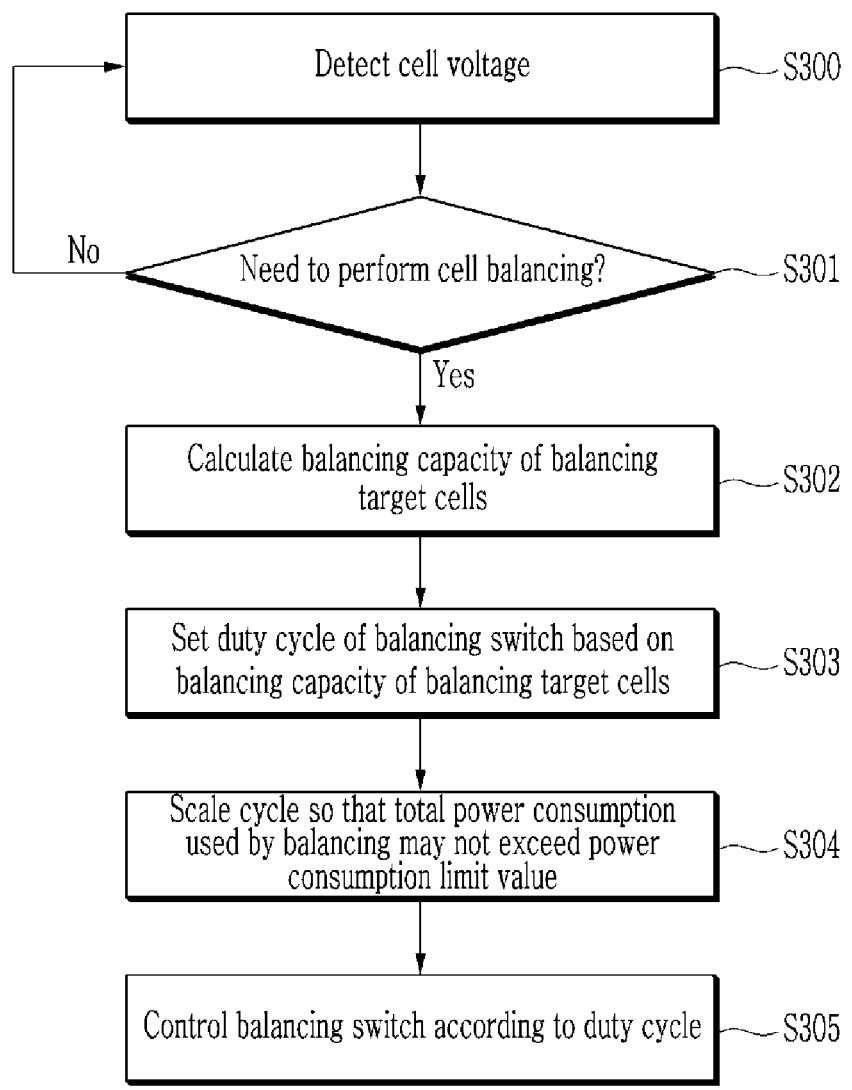
FIG. 16 shows a cell-balancing method according to a third embodiment of the present disclosure.

FIG. 16 shows a cell-balancing method according to a third embodiment of the present disclosure.

Referring to FIG. 16, the battery packs 10a, 10b, and 10c periodically detect the cell voltages of the respective cells configuring the battery module 100 through the battery IC 200 according to a third embodiment of the present disclosure (S300).

The cell voltages detected by the battery IC 200 are transmitted to the battery controller 300, and the battery controller 300 determines whether a cell-balancing on the battery module 100 is warranted (S301).

The battery controller 300, when a cell-balancing is determined to be warranted, calculates balancing capacity of the respective balancing target cell subject based on the cell voltages of the cells (S302).

When the balancing capacity for the respective balancing target cells is calculated, the battery controller 300 sets the duty cycles of the balancing switches (SWb) based on the calculated balancing capacity (S303).

In S303, the battery controller 300 may set the ratio of balancing capacities of the balancing target cells and the ratio of the duty cycles of the balancing switches (SWb) of the balancing target cells to be substantially identical.

In S303, regarding the battery pack (e.g., the battery pack 10a shown in FIG. 2) to which a cell-balancing is performed according to a method for alternately performing balancing on adjacent cells, when the duty cycles of the balancing switches (SWb) are set based on the balancing capacities among balancing target cells, the battery controller 300 may scale the duty cycles of the balancing switches (SWb) so that the summation of duty cycles between two adjacent cells may be less than or equal to a maximum of 100% as expressed in Equation 9.

When the duty cycles of the respective balancing switches (SWb) are set according to the balancing capacity through S303, the average balancing currents of the respective balancing channels are maintained from the balancing start time to the ending time, and the heat generated as a result may be substantially constant. Therefore, the battery controller 300 may scale the duty cycles of the balancing switches (SWb) based on a power consumption upper limit allowable to the balancing channels as a whole (S304). Here, the power consumption upper limit is provided as a register setting value inside the battery IC 200, may be modified by software, and may be improved or optimized by checking the generation of heat on the actual substrate in a product developing stage.

The duty cycles scaled through S304 are included in cell-balancing control information and are then transmitted to the battery IC 200, and the battery IC 200 controls the turn-on/off of the balancing switches (SWb) (S305).

In S304, the battery controller 300 sums the balancing capacities of the balancing target cells to calculate a total power consumption generated by balancing, and compares the total power consumption and a power consumption upper limit. When the total power consumption generated by a balancing exceeds the power consumption upper limit, the battery controller 300 scales the duty cycles of the balancing switches (SWb) to reduce the power consumption used by a balancing.

A method for scaling duty cycles of balancing switches (SWb) based on a power consumption upper limit in S304 will now be described.

While the duty cycle ($D_{Ci\_scale}$) of the balancing switch (SWb) is set by use of Equation 9, the average balancing current ($I_{b\_ave\_Ci}$) of the respective balancing channels may be calculated as in Equation 11.

$$I_{b\_ave\_Ci} = I_b \times D_{Ci\_scale} \quad \text{Equation 11}$$

When the average balancing current ($I_{b\_ave\_Ci}$) is calculated for the respective balancing channels through Equation 11, the battery controller uses the same to calculate the current scale factor ($w_c$) as expressed in Equation 12.

$$w_c = I_{Limit} / (\Sigma I_{b\_ave\_Ci}) \quad \text{Equation 12}$$

In Equation 12, $I_{Limit}$ is a current upper limit allowable on the substrate on which the balancing resistors are mounted, and $\Sigma I_{b\_ave\_Ci}$ is the sum of average balancing currents in all of the balancing target channels.

When the current scale factor ($w_c$) is calculated through Equation 12, the battery controller 300 applies the same to the duty cycle ($D_{Ci\_scale}$) scaled through Equation 10 as expressed in Equation 13.

$$D_{Ci\_limit} = D_{Ci\_scale} \times (w_c) = (Q_b)/(Q_{b\_max}) \times 50\% \times w \times w_c \quad \text{Equation 13}$$

Referring to Equation 13, the heat radiation performance of the substrate may be obtained by applying the current scale factor ($w_c$) to the duty cycle ($D_{Ci\_scale}$) of the balancing target cells in a third embodiment of the present disclosure.

Figure 17:
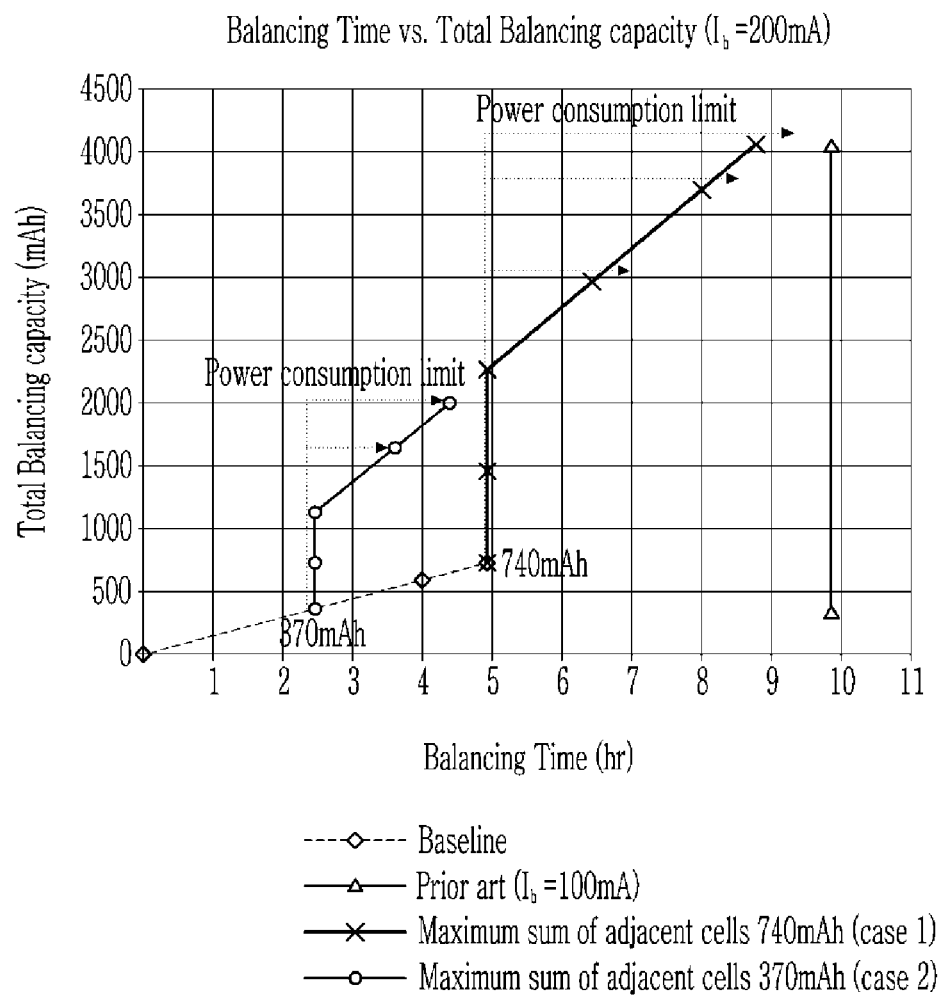
FIG. 17 shows a relationship between total balancing capacity of all balancing channels and a balancing time when a cell-balancing method according to a third embodiment of the present disclosure is applied.

FIG. 17 shows a relationship between total balancing capacity of all balancing channels and a balancing time when a cell-balancing method according to a third embodiment of the present disclosure is applied, exemplifying the case in which the battery module 100 includes twelve 37 Ah cells connected in series to each other and the balancing current ($I_b$) is 200 mA.

Referring to FIG. 17, the balancing time is determined corresponding to the maximum value from among the balancing capacities among adjacent cells. In a third embodiment of the present disclosure, when the total balancing capacity of the balancing target cells exceeds a limit (e.g., a predetermined power consumption upper limit), the duty cycles of the balancing switches (SWb) reduce by the current scale factor, and the balancing time accordingly increases.

However, when the duty cycle is reduced by using a current scale factor, the balancing time is reduced in comparison with the case in which the balancing current is reduced (e.g., $I_b$=100 mA) to the level corresponding to the power limit, so efficient discharging may progress within a range of allowable power.

Further, in the described third embodiment of the present disclosure, the power consumption upper limit of the balancing resistors is set in consideration of the heat radiation performance of the substrate, and the duty cycles of the balancing switches (SWb) are controlled so that the total/entire power consumption used by a cell-balancing may not exceed the upper limit.

However, the power consumption individually used by the respective balancing resistors differs in accordance with the respective duty cycle (or the duration) of the balancing switch (SWb). Accordingly, deviation or variation exists with respect to a respective amount of heat generated by the balancing resistors. When the power consumption used by an entirety of the balancing resistors is the same, the amount of heat generated by the substrate may differ because of the difference of the duty cycles (or the duration) of the respective balancing switches (SWb).

Hence, in a fourth embodiment of the present disclosure described below, when the duty cycle (or the on duration) of the balancing switch (SWb) is set, the cell-balancing efficiency may be increased by limiting power in consideration of a power consumption deviation among balancing resistors.

A cell-balancing method according to a fourth embodiment of the present disclosure will now be described with reference to FIG. 18 and FIG. 19.

Figure 18:
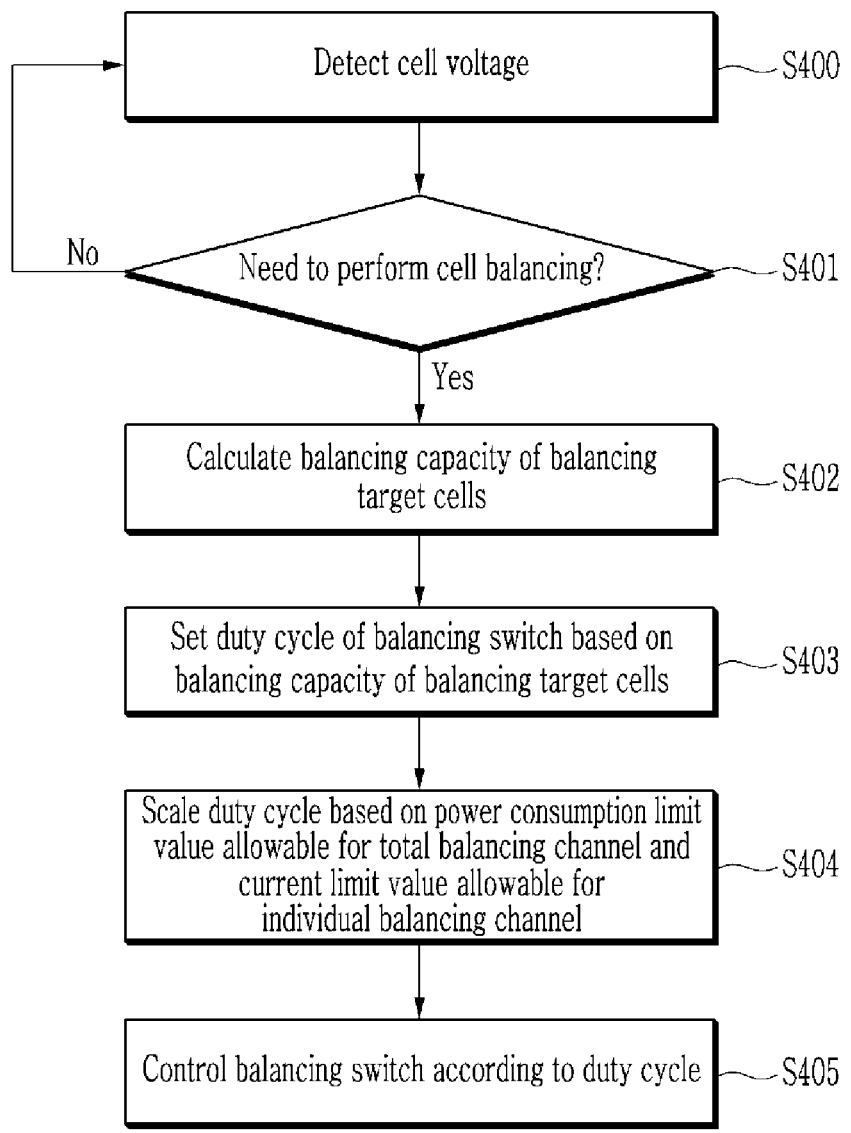
FIG. 18 shows a cell-balancing method according to a fourth embodiment of the present disclosure.

FIG. 18 shows a cell-balancing method according to a fourth embodiment of the present disclosure.

Referring to FIG. 18, according to a fourth embodiment of the present disclosure, the battery packs 10a, 10b, and 10c periodically detect the cell voltages of the cells configuring the battery module 100 through the battery IC 200 (S400).

The cell voltages detected by the battery IC 200 are transmitted to the battery controller 300, and the battery controller 300 determines whether a cell-balancing on the battery module 100 is warranted (S401).

The battery controller 300, when a cell-balancing is determined to be warranted, calculates a balancing capacity for each of the respective balancing target cells that are subject to a balancing based on the cell voltages of the cells (S402).

When the balancing capacity on the balancing target cells is calculated, the battery controller 300 sets the duty cycle of the corresponding balancing switch (SWb) based on the calculated balancing capacity (S403).

In S403, the battery controller 300 may set the ratio(s) between balancing capacities of the balancing target cells and the ratio(s) between the duty cycles of the corresponding balancing switches of the balancing target cells (SWb) to be substantially identical.

In S403, regarding the battery pack (e.g., the battery pack 10a shown in FIG. 2) to which a cell-balancing is performed according to a method for alternately performing a balancing on adjacent cells, the battery controller 300 may scale the duty cycles of the balancing switches (SWb) so that the summation of duty cycles between two adjacent cells may be less than or equal to a maximum of 100% as expressed in Equation 9.

When the duty cycles of the balancing switches (SWb) are set according to the corresponding balancing capacity through S403, the battery controller 300 may scale the duty cycles of the balancing switches (SWb) based on the power consumption upper limit allowable to all of the balancing channels and the current upper limit allowable for the individual balancing channel (S404).

Here, the power consumption upper limit allowable for all of the balancing channels and the current upper limit allowable for one balancing channel are provided as register setting values inside the battery IC 200. However, they may be modifiable (e.g., by using software), and they may be improved or optimized by checking or testing heat generation on the actual substrate in the product developing stage.

The duty cycles scaled through S404 are included in cell-balancing control information and are transmitted to the battery IC 200, and the battery IC 200 controls on time/off time (e.g., turn-on/off operations) of the balancing switches (SWb) (S405).

A method for scaling duty cycles of balancing switches (SWb) in S404 will now be described in detail.

When the duty cycle (or duration) of the balancing switch (SWb) is 100%, power consumption corresponding to a balancing resistor is the greatest (e.g., at a maximum), and the amount of heat generated is also the greatest/at a maximum. As the number of balancing channels discharged by a cell-balancing increases, the heat radiation performance of the substrate is deteriorated.

In consideration of this point, in a fourth embodiment of the present disclosure, Equation 12 for calculating a current scale factor ($w_c$) will be substituted into Equation 14.

$$w_c = (I_{Limit\_total}/(\Sigma I_{b\_ave\_Ci})) \times (I_{Limit\_Ci}/I_{b\_ave\_Ci}) \qquad \text{Equation 14}$$

In Equation 14, $I_{Limit\_total}$ is a current upper limit that is suitable for the balancing channels as a group, and $I_{Limit\_Ci}$ is a current upper limit for a single balancing channel. Also, $I_{b\_ave\_Ci}$ is an average balancing current of balancing channels, and $I_{b\_ave\_Ci}$ is an average balancing current of the balancing channels as a whole.

When the current scale factor ($w_c$) corresponding to the balancing switches (SWb) is calculated through Equation 14, the battery controller 300 substitutes the same into Equation 13 to finally acquire the duty cycles ($D_{Ci\_limit}$) of the balancing switches (SWb). Accordingly, the power consumption at the time of performing a balancing may be limited by considering local generation of heat in the cell-balancing circuit in addition to the overall heat radiation performance of the substrate on which the cell-balancing circuit is mounted.

Figure 19:
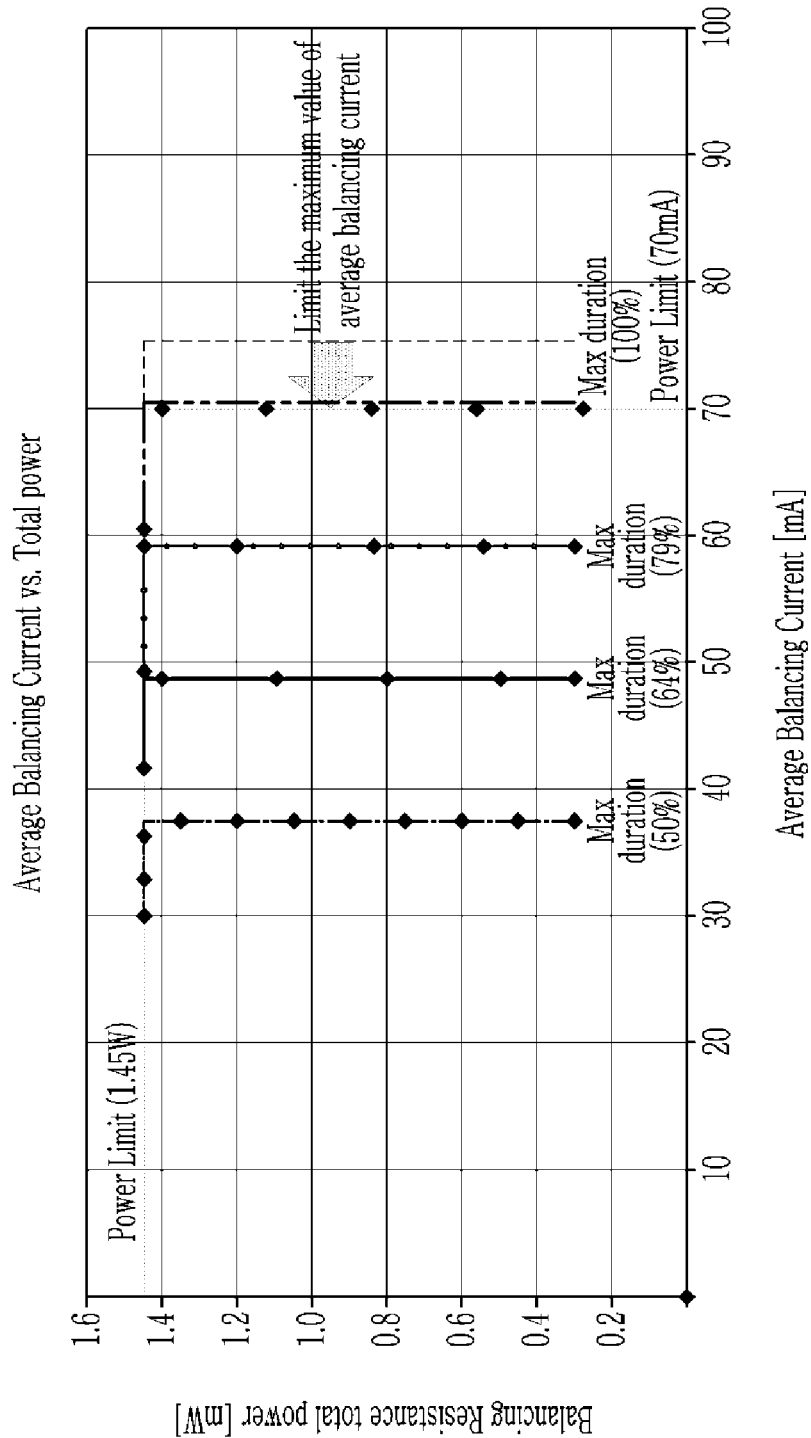
FIG. 19 shows a relationship between an average balancing current of balancing channels and balancing resistance total power when a cell-balancing method according to a fourth embodiment of the present disclosure is applied.

FIG. 19 shows a relationship between an average balancing current in respective balancing channels and power consumption of all of the balancing resistors (e.g., balancing resistance total power) when a cell-balancing method according to a fourth embodiment of the present disclosure is applied. In the present example, the battery module 100 includes twelve 37 Ah cells connected in series to each other and the balancing current ($I_b$) is 100 mA.

Referring to FIG. 19, when the balancing resistance total power is greater than the upper limit (1.45 W) of power consumption allowable for the balancing channels as a group, the duty cycle set for all of the balancing channels is controlled to reduce the average consumption current of the balancing channels.

Further, in an example of the fourth embodiment of the present disclosure, the current upper limit (70 mA) is set for the individual balancing channel, and the duty cycle of the balancing switch (SWb) so as to reduce the average consumption current regarding the balancing channel that exceeds the current upper limit.

The cell-balancing performing timing may be divided into a key-on state of the battery pack, and a key-off state. In the present specification, the key-on state corresponds to a state in which the battery pack is currently discharged by an operation of a set or device (e.g., a vehicle) on which the battery pack is mounted, or in which the battery pack is currently charged by a charging device.

At the key-on time of the battery pack, a cell-balancing may be performed in an environment in which the battery management system (BMS) periodically performs functions such as diagnosis. Therefore, when the time used for a cell-balancing is relatively long, it may be useful to temporarily pause the cell-balancing because of diagnosis, which may make it more difficult to set the duty cycle.

To solve this problem, in a fourth embodiment of the present disclosure, when a cell-balancing is performed, the cell-balancing process is divided into a plurality of steps to be discretely performed. In a fifth embodiment of the present disclosure, the balancing performing time is obtained using a counter, and when the balancing performing time becomes equivalent to the duty-setting value (e.g., a duration value), the balancing stops.

Through this, the "On" duty controls becomes allowable within a period (e.g., a predetermined period). The cell-balancing is performed up to the balance capacity that is the final target by continuing the above-noted operation.

A cell-balancing method according to a fifth embodiment of the present disclosure will now be described with reference to FIG. 20 to FIG. 24.

Figure 20:
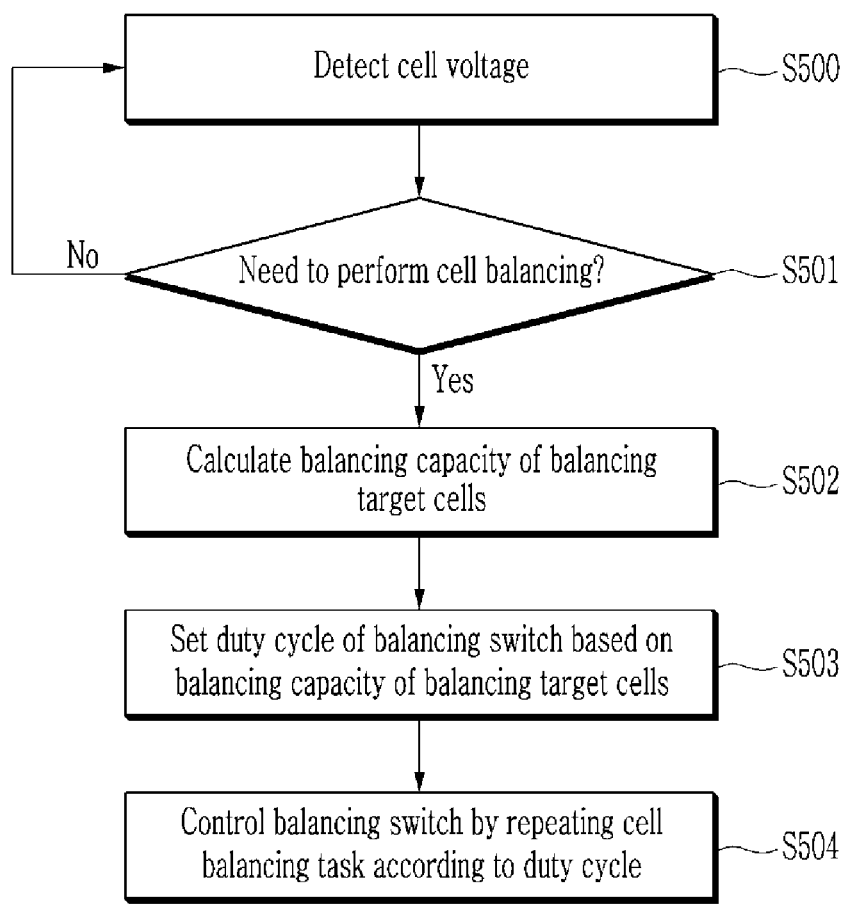
FIG. 20 shows a cell-balancing method according to a fifth embodiment of the present disclosure, showing a case of performing a cell-balancing in a key-on state.

FIG. 20 shows a cell-balancing method according to a fifth embodiment of the present disclosure, and depicts an example of performing a cell-balancing in a key-on state.

Referring to FIG. 20, according to a fifth embodiment of the present disclosure, the battery packs 10a, 10b, and 10c periodically detect the cell voltages of respective cells configuring the battery module 100 through the battery IC 200 (S500).

The cell voltages detected by the battery IC 200 are transmitted to the battery controller 300, and the battery controller 300 determines whether a cell-balancing on the battery module 100 is warranted (S501).

The battery controller 300, when a cell-balancing is determined to be warranted, calculates one or more balancing capacities of the balancing target cells subject to a balancing based on the cell voltages of respective cells (S502).

The battery controller 300, when the balancing capacity on the balancing target cells is calculated, sets the duty cycle of the corresponding balancing switch (SWb) based on the calculated balancing capacity (S503).

In S503, the battery controller 300 may set the ratio between balancing capacities of balancing target cells and the ratio between the duty cycles of the corresponding balancing switches (SWb) of the balancing target cells to be substantially identical.

In S503, when the duty cycles of the balancing switches (SWb) are set based on the ratio between balancing capacities of balancing target cells, the battery controller 300 may scale the duty cycles of the balancing switches (SWb) so that the sum of duty cycles between two adjacent cells may be less than or equal to a maximum of 100% as in S204.

In S503, when the duty cycles of the balancing switches (SWb) are set based on the ratio between balancing capacities of balancing target cells, the battery controller 300 may scale the duty cycles of the balancing switches (SWb) based on the power consumption upper limit allowable for the balancing channels as in S304.

In S503, when the duty cycles of the balancing switches (SWb) are set according to the balancing capacity, the battery controller 300 may scale the duty cycles of respective balancing switches (SWb) based on the power consumption upper limit allowable for the balancing channels as a whole, and the current upper limit allowable for the individual balancing channel as in S404.

The duty cycles calculated for the respective balancing switches (SWb) through S503 are included in cell-balancing control information, and are transmitted to the battery IC 200. The battery IC 200 controls the respective balancing switches (SWb) to turn them on and off. In this instance, the battery controller 300 repeats the cell-balancing task according to the duty cycle to thus control the turn-on/off of the balancing switches (SWb) (S504).

In S504, the cell-balancing task is a task performed for a shorter period than the balancing cycle, and it turns on the balancing switch (SWb) for a period (e.g., a predetermined period) while the task is executed. The battery controller 300 may repeat the cell-balancing task so that the total time in which a balancing discharging is performed by a repetition execution of the cell-balancing task within the balancing cycle may be substantially identical with the duration of the corresponding balancing switch (SWb).

Figure 21:
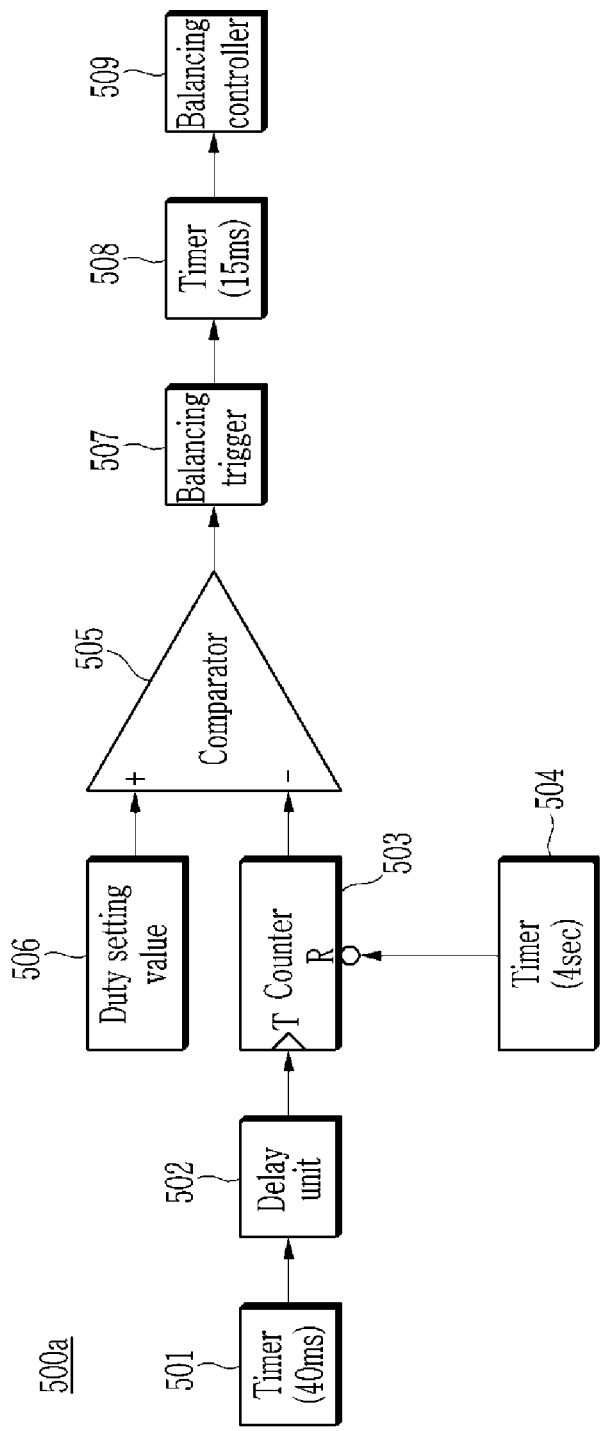
FIG. 21 shows a cell-balancing control circuit for performing a cell-balancing method according to a fourth embodiment of the present disclosure.
Figure 22:
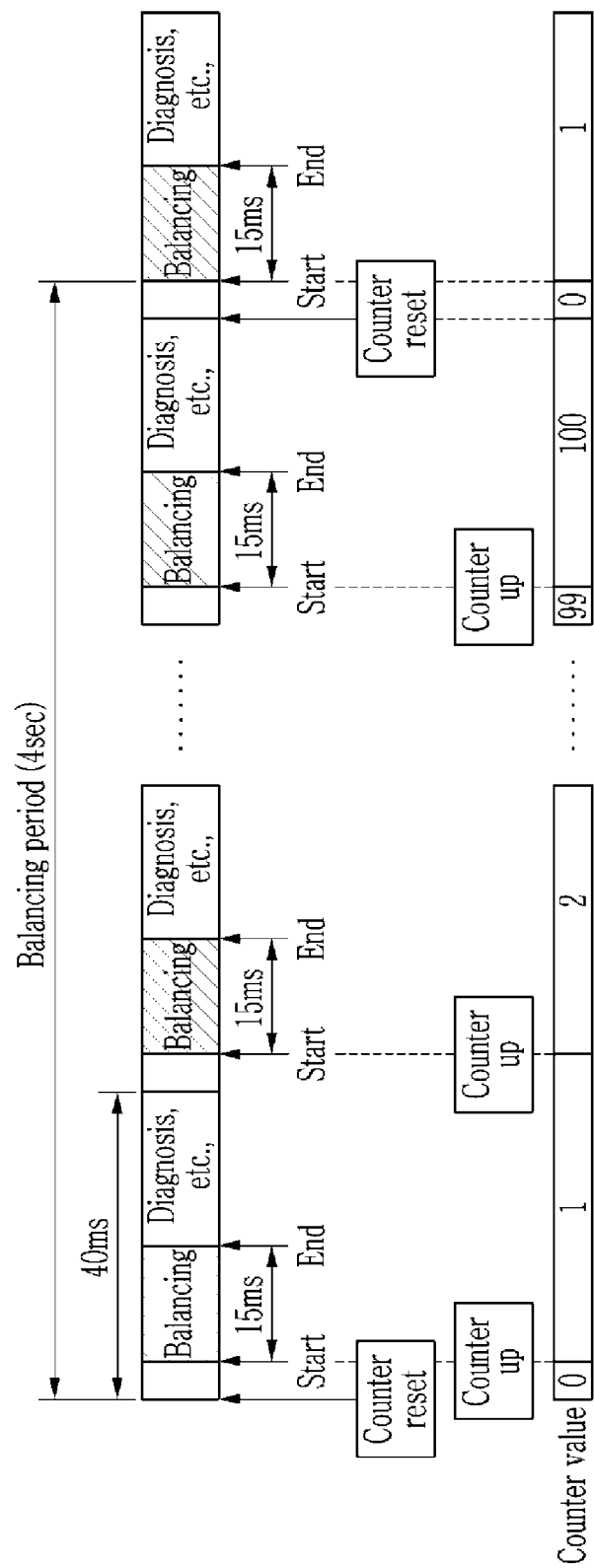
FIG. 22 shows a chart of a cell-balancing control timing diagram of a cell-balancing control circuit shown in FIG. 21.
Figure 23:
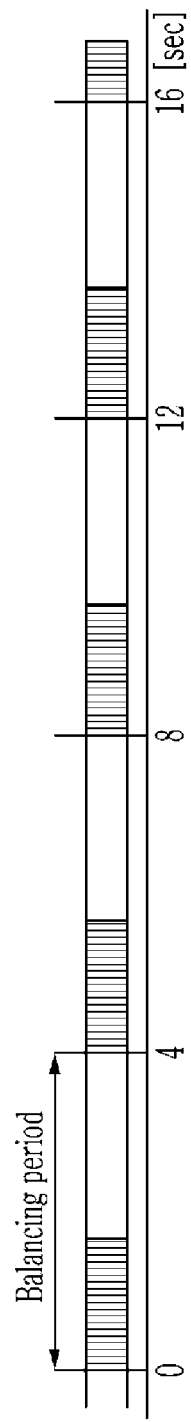
FIG. 23 shows a balancing control timing diagram using a cell-balancing control circuit shown in FIG. 21.

FIG. 21 shows a cell-balancing control circuit for performing a cell-balancing method according to a fourth embodiment of the present disclosure shown in FIG. 20. FIG. 22 shows a chart of a cell-balancing control timing diagram of a cell-balancing control circuit shown in FIG. 21, and FIG. 23 shows a balancing control timing diagram using a cell-balancing control circuit shown in FIG. 21. The cell-balancing control circuit shown in FIG. 21 may be included in the battery monitoring circuit 210 of the battery packs 10a, 10b, 10c, and 10d described with reference to FIG. 2 to FIG. 5.

Referring to FIG. 21, the cell-balancing control circuit 500a for performing a cell-balancing method according to a fourth embodiment of the present disclosure may include a plurality of timers 501, 504, and 508, a delay unit 502, a counter 503, a comparator 505, a balancing trigger 507, and a balancing controller 509.

The timer 501 generates a timing signal with an execution cycle (e.g., 40 ms) of the cell-balancing task (Task).

The delay unit 502 delays the timing signal output by the timer 501 by an amount of time (e.g., a predetermined time), and transmits the delayed timing signal to the counter 503.

Accordingly, the timing signal generated by the timer 501 is transmitted to the counter 503 to generate a counting up of the counter 503.

The timer 504 generates a timing signal for each balancing cycle (e.g., 4 sec). The timing signal generated by the timer 504 is input to the counter 503, and resets the counter 503.

Therefore, the counter 503, as shown in FIG. 21, increases a counter value through a count up for each 40 ms that is an execution period of the cell-balancing task, and is reset for each 4 sec that is a balancing cycle.

The counter value generated by the counter 503 is transmitted to the comparator 505.

The comparator 505 receives a counter value input by the counter 503, and receives a duty-setting value 506 of the corresponding balancing channel, and outputs a comparison result of the two values. Here, the duty-setting value 506 is acquired from the duty cycle set for the corresponding balancing channel, and corresponds to the number of times of execution of the cell-balancing tasks for satisfying the duty cycle of the corresponding balancing channel.

That is, the duty-setting value corresponds to the number of executions of the cell-balancing tasks by which the total time of balancing discharging that is performed by a repetitive execution of cell-balancing tasks becomes substantially identical to the total duration of time that is set for the corresponding balancing channel.

When the counter value input by the counter 503 is less than the duty-setting value 506 of the corresponding balancing channel, the comparator 505 enables the balancing trigger 507. Contrarily, when the counter value input by the counter 503 is equal to or greater than the duty-setting value 506 of the corresponding balancing channel, the comparator 505 disables the balancing trigger 507.

The balancing trigger 507 triggers the operation of the timer 508, and is enabled/disabled by the comparator 505. That is, the balancing trigger 507 operates the timer 508 while being enabled by the comparator 505.

The timer 508 is operated by the balancing trigger 507, and generates a timing signal for instructing a balancing discharge section (e.g., 15 ms) within the execution cycle of the cell-balancing task.

The balancing controller 509 controls the operation (e.g., turn-on/off) of the corresponding balancing switch (SWb) according to the timing signal output by the timer 508.

Referring to FIG. 22 and FIG. 23, the output counter 503 in the present example counts up the counter value for each 40 msec execution cycle of the cell-balancing task by the timer 501, and is reset for each 4 sec balancing cycle. The counter value is input to the comparator 505 and is compared with the duty-setting value 506.

The comparator 505 enables the balancing trigger 507 when the counter value is less than the duty-setting value 506. When the balancing trigger 507 is enabled by the comparator 505, it operates the timer 508, and the balancing controller 509 turns on the balancing switch (SWb) for 15 ms according to the timing signal generated by the operation of the timer 508 such that balancing discharging is performed for 15 ms.

When the counter value is equal to or greater than the duty-setting value 506, the comparator 505 disables the balancing trigger 507, and the timer 508 is also disabled and the balancing discharging is not performed.

As described above, when the balancing discharging within one balancing cycle is processed by a repetitive execution of cell-balancing tasks, and when the balancing discharging progresses for part of the section while one cell-balancing task is performed, it is possible to perform another task, such as diagnosis, for the remaining section in which the balancing discharging is not performed. Accordingly, it is possible to simultaneously perform a cell-balancing task and another task.

Figure 24:
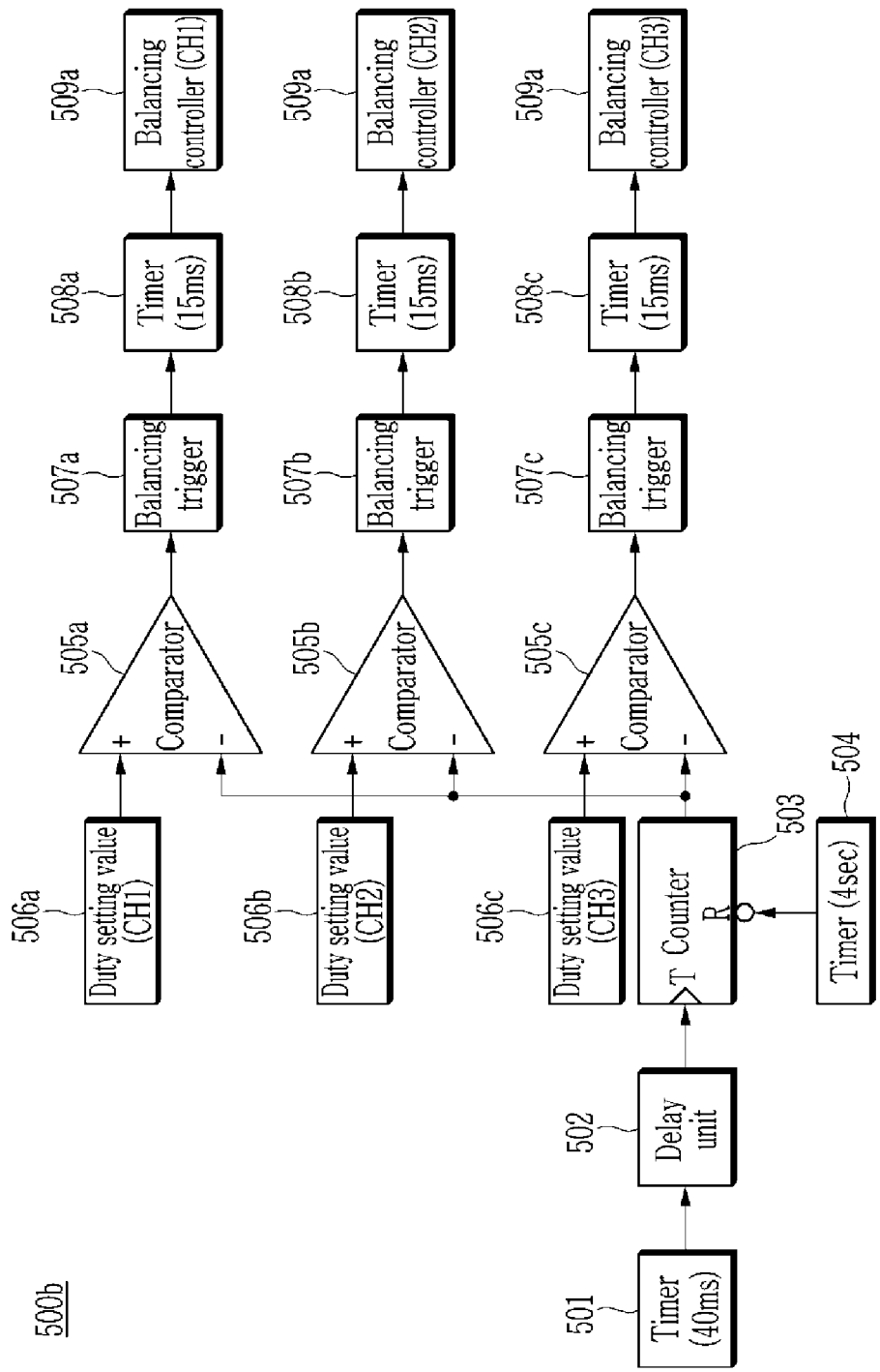
FIG. 24 shows another example of a cell-balancing control circuit for performing a cell-balancing method according to a fourth embodiment of the present disclosure.

The cell-balancing control circuit 500a shown in FIG. 21 represents a balancing control circuit for one balancing channel, and when this is applied to a plurality of balancing channels, they may configure a cell-balancing control circuit 500b as shown in FIG. 24.

Figure 25:
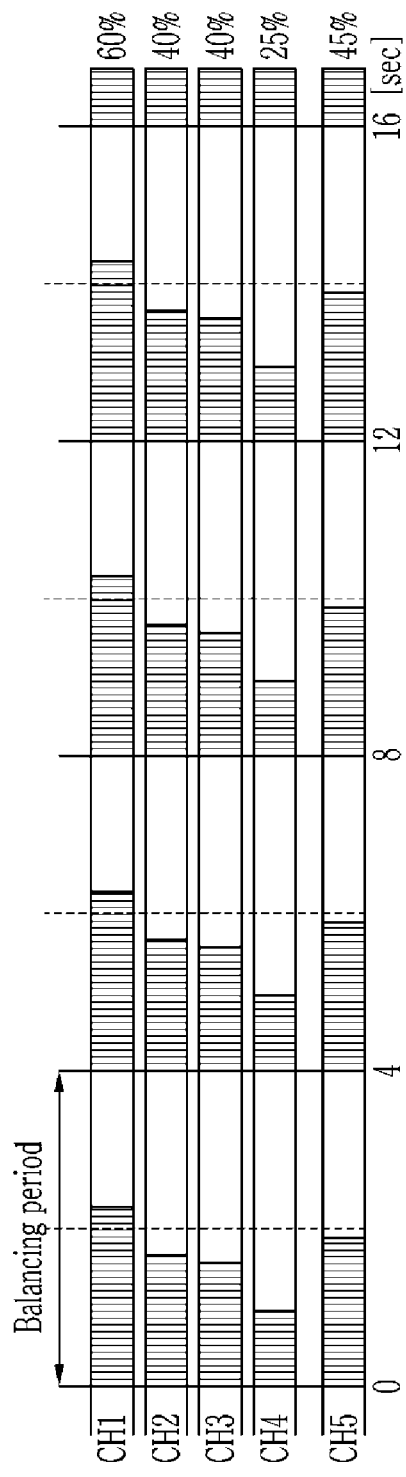
FIG. 25 shows a balancing control timing diagram using a cell-balancing control circuit of FIG. 24.

FIG. 24 shows another example of a cell-balancing control circuit for performing a cell-balancing method according to a fourth embodiment of the present disclosure shown in FIG. 20, in which three balancing channels are shown as an example. FIG. 25 shows a balancing control timing diagram using a cell-balancing control circuit of FIG. 24. The cell-balancing control circuit 500b shown in FIG. 24 may be included in the battery monitoring circuit 210 of the battery packs 10b, 10c, and 10d described with reference to FIG. 3 to FIG. 5.

Referring to FIG. 24, the cell-balancing control circuit 500b shares the timers 501 and 504, the delay unit 502, and the counter 503 relating to the execution of cell-balancing tasks for all balancing channels. The comparators 505a, 505b, and 505c, the balancing triggers 507a, 507b, and 507c, the timers 508a, 508b, and 508c, and the balancing controllers 509a, 509b, and 509c relating to execution of balancing discharging for the respective balancing channels are independently used for the respective balancing channels.

The counter 503 counts up the counter value for each 40 msec execution cycle of cell-balancing tasks by the timer 501, and it is reset for each 4 sec balancing cycle.

The counter values counted by the counter 503 are input to the comparators 505a, 505b, and 505c of the respective balancing channels CH1, CH2, and CH3, and are compared with the corresponding duty-setting values 506a, 506b, and 506c.

The comparators 505a, 505b, and 505c enable the corresponding balancing triggers 507a, 507b, and 507c when the counter value is less than the corresponding duty-setting values 506a, 506b, and 506c. When the balancing triggers 507a, 507b, and 507c are enabled by the comparators 505a, 505b, and 505c, they operate the corresponding timers 508a, 508b, and 508c, and the balancing controllers 509a, 509b, and 509c of the corresponding balancing channel turn on the balancing switch (SWb) for 15 ms according to the timing signal generated by the operation of the respective timers 508a, 508b, and 508c, such that the balancing discharging is performed for 15 ms.

When the counter value is equal to, or greater than, the corresponding duty-setting values 506a, 506b, and 506c, the comparators 505a, 505b, and 505c disable the corresponding balancing triggers 507a, 507b, and 507c to stop the balancing discharging of the corresponding balancing channel.

The cell-balancing control circuit 500b of FIG. 24, as shown in FIG. 25, represents a cell-balancing control circuit for the case in which the balancing of the odd-numbered cell and the even-numbered cell may be simultaneously performed.

Figure 26:
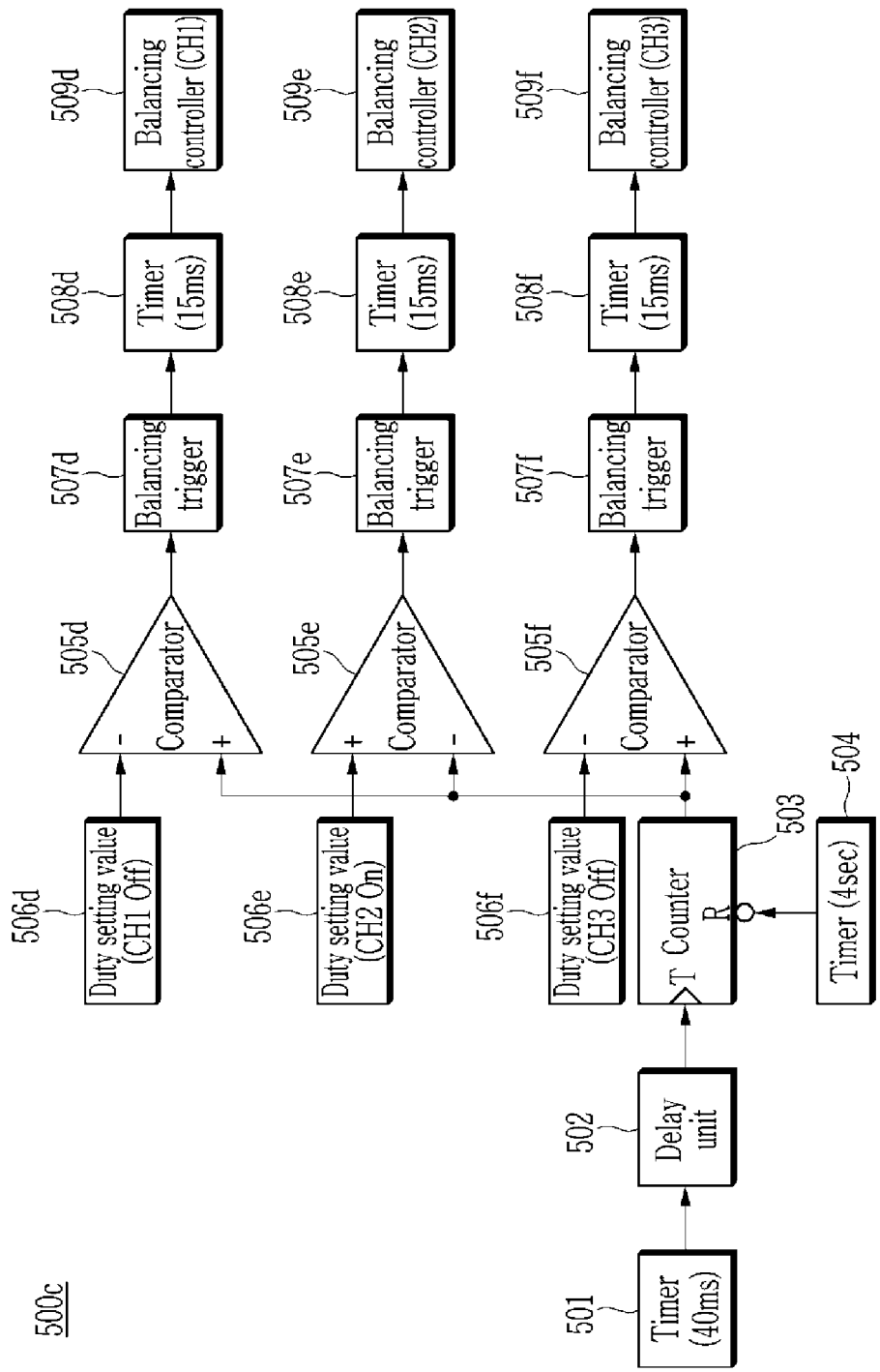
FIG. 26 shows another example of a cell-balancing control circuit for performing a cell-balancing method according to a fourth embodiment of the present disclosure.
Figure 27:
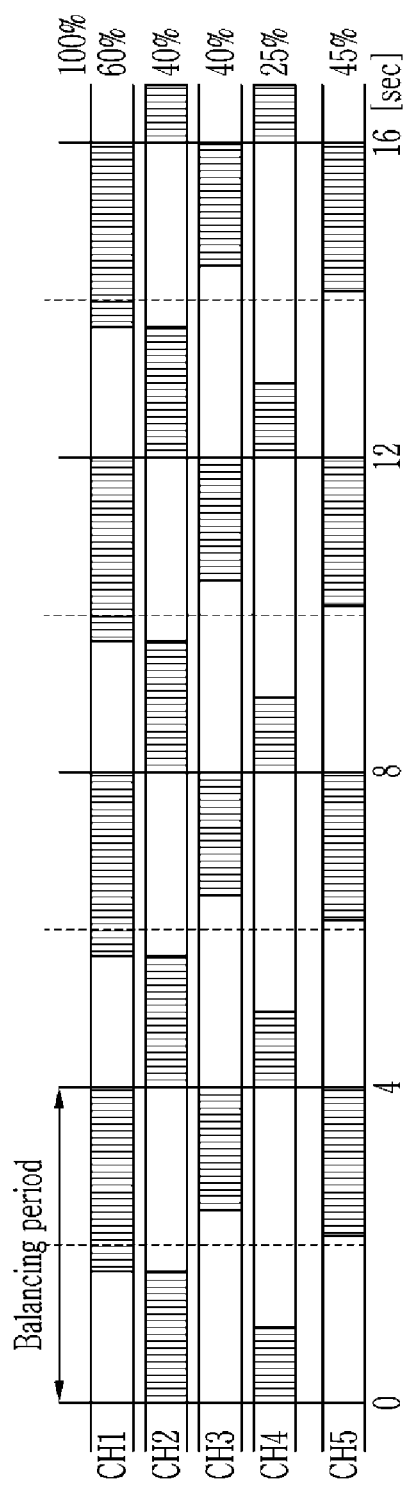
FIG. 27 shows a balancing control timing diagram using a cell-balancing control circuit of FIG. 26.

FIG. 26 shows another example of a cell-balancing control circuit for performing a cell-balancing method according to a fourth embodiment of the present disclosure shown in FIG. 20, indicating a case in which a balancing of the odd-numbered cell and the even-numbered cell are alternately performed in a like manner of the battery pack 10a described with reference to FIG. 2. FIG. 27 shows a balancing control timing diagram using a cell-balancing control circuit of FIG. 26.

Referring to FIG. 26, the cell-balancing control circuit 500c shares the timers 501 and 504, the delay unit 502, and the counter 503 relating to the execution of cell-balancing tasks on the balancing channels, and the comparators 505d, 505e, and 505f, the balancing triggers 507d, 507e, and 507f, the timers 508d, 508e, and 508f, and the balancing controllers 509d, 509e, and 509f relating to the execution of balancing discharging of the respective balancing channels are independently used for the respective balancing channels.

The counter 503 counts up the counter value for each 40 msec that is the execution cycle of the cell-balancing task by the timer 501, and is reset for each 4 sec that is the balancing cycle.

The counter value counted by the counter 503 are input to the comparators 505d, 505e, and 505f of the balancing channels CH1, CH2, and CH3 and are compared to the duty-setting values 506d, 506e, and 506f. The duty-setting values 506d, 506e, and 506f may be set to the odd-numbered channels CH1 and CH3 corresponding to the off duty (e.g., calculated by 100%−ON Duty %) and may be set to the even-numbered channel CH2 corresponding to the on duty (e.g., corresponding to the duration of the on duty).

Here, the duty-setting value 506e corresponding to the "On" duty is obtained from the duty cycle set for the corresponding balancing channel CH2, and it corresponds to the number of separate cell-balancing tasks for the "On" section of the corresponding balancing channel. Further, the duty-setting values 506d and 506f set corresponding to the "Off" duty is obtained from the duty cycle set for the corresponding balancing channels CH1 and CH3, and corresponds to the execution number of cell-balancing tasks for the "Off" section of the corresponding balancing channel.

Accordingly, when the counter value is equal to or greater than the duty-setting values 506d and 506f set corresponding to the "Off" duty, the comparators 505d and 505f of the odd-numbered balancing channels CH1 and CH3 enable the balancing triggers 507d and 507f. The timers 508d and 508f are operated, and the balancing controllers 509d and 509f of the corresponding balancing channels CH1 and CH5 turn on the balancing switch (SWb) for 15 ms, so the balancing discharging is performed for 15 ms.

Contrarily, when the counter value is less than the duty-setting values 506d and 506f set corresponding to the "Off" duty, the comparators 505d and 505f of the odd-numbered balancing channels CH1 and CH3 disable the corresponding balancing triggers 507a, 507b, and 507c to thus stop the balancing discharging of the corresponding balancing channels CH1 and CH3.

When the counter value is equal to or greater than the duty-setting value 506e set corresponding to the "Off" duty, the comparator 505e of the even-numbered balancing channel CH2 enables the balancing trigger 507e. Accordingly, the timer 508e is operated, and the balancing controller 509e of the balancing channel CH2 turns on the balancing switch (SWb) for 15 ms, so the balancing discharging is performed for 15 ms.

Contrarily, when the counter value is less than the duty-setting value 506e set corresponding to the "Off" duty, the comparator 505e of the balancing channel CH2 disables the corresponding balancing trigger 507e to stop the balancing discharging of the corresponding balancing channel CH2.

Accordingly, when the sum of the duty cycles of two adjacent cells is equal to or less than 100%, as shown in FIG. 27, it is possible to control the balancing discharging of the odd-numbered cell and the even-numbered cell to be not simultaneously performed. It is shown in FIG. 26 and FIG. 27 that the balancing discharging of the even-numbered cell within the balancing cycle is performed, and the balancing discharging of the odd-numbered cell is then performed. It is also possible to allow the balancing discharging of the odd-numbered cell within the balancing cycle to be performed, and the balancing discharging of the even-numbered cell to be then performed. In this case, the duty-setting value is set corresponding to the "Off" duty (e.g., calculated by 100%−ON Duty %) regarding the even-numbered channel, and it may be set corresponding to the "On" duty (i.e., duration) regarding the odd-numbered channel.

According to the above-described embodiments, the heat radiation performance of the substrate may be maintained and the balancing time may be reduced.

The accompanying drawings and the embodiments of the present disclosure are only examples of the present disclosure, and are used to describe the present disclosure but do not limit the scope of the present disclosure as defined by the following claims. It will be understood by those of ordinary skill in the art that various modifications and equivalent embodiments may be made. Therefore, the technical scope of the present disclosure may be defined by the technical idea of the following clams, with functional equivalents thereof to be included herein.

What is claimed is:
1. A battery management system comprising:
   a plurality of balancing resistors respectively forming balancing discharging paths of cells connected in series to each other;
   a plurality of balancing switches respectively connected between the cells and the balancing resistors, and configured to control cell-balancing of each of the cells;
   a voltage-detecting circuit for detecting respective cell voltages of the cells; and
   a battery controller for acquiring respective balancing capacities of the cells based on the cell voltages, for obtaining duty cycles of the balancing switches according to the balancing capacities, and for scaling the duty cycles of the balancing switches according to a sum of duty cycles of two adjacent cells from among the cells.
2. The battery management system of claim 1, wherein the two adjacent cells partly share a balancing discharging path for cell-balancing.
3. The battery management system of claim 2, wherein balancing switches of the two adjacent cells are alternately turned on.
4. The battery management system of claim 1, wherein the battery controller is configured to calculate a sum of duty cycles of combinations of two adjacent cells, is configured to calculate a scale factor so that a maximum value of the sum of the duty cycles is 100%, and is configured to scale the duty cycles of the balancing switches using the scale factor.
5. The battery management system of claim 1, wherein the battery controller is configured to set a ratio of respective ones of the duty cycles of the balancing switches based on a ratio of the respective balancing capacities of the cells.
6. The battery management system of claim 1, further comprising a battery integrated circuit for controlling the balancing switches according to the duty cycles of the balancing switches.

7. A battery management system comprising:
a plurality of balancing resistors respectively forming balancing discharging paths of cells connected in series to each other;
a plurality of balancing switches respectively connected between the cells and the balancing resistors for controlling a cell-balancing of each of the cells;
a voltage-detecting circuit for detecting cell voltages of the cells;
a battery controller for acquiring balancing capacities of the cells based on the cell voltage, and for obtaining duty cycles of the balancing switches according to the balancing capacities; and
a battery integrated circuit for controlling operation of the balancing switches by using a balancing task, which is repeatedly executed during an execution cycle that is shorter than a balancing cycle, and which corresponds to the duty cycles, to allow a turn-on state of the balancing switches only during a part of an execution period of the balancing task.

8. The battery management system of claim 7, wherein the battery integrated circuit is configured to count on-periods, in which the balancing switches are turned on by the balancing task within one balancing cycle, for each of the balancing switches, and is configured to maintain a state of a balancing switch in a turn-off state until the balancing cycle ends, wherein a value obtained by counting the on-periods corresponds to a duration of a corresponding duty cycle.

9. The battery management system of claim 7, wherein the battery controller sets a ratio of respective ones of the duty cycles of the balancing switches based on a ratio of respective ones of the balancing capacities of the cells.

10. The battery management system of claim 9, wherein the battery controller is configured to scale the duty cycles of the balancing switches according to a sum of duty cycles between two adjacent cells from among the cells.

11. The battery management system of claim 9, wherein the battery controller is configured to scale the duty cycles of the balancing switches according to a power consumption upper limit of the cells.

12. The battery management system of claim 9, wherein the battery controller is configured to scale duty cycles of the balancing switches according to a current upper limit of a single balancing discharging path.

* * * * *

UNITED STATES PATENT AND TRADEMARK OFFICE
CERTIFICATE OF CORRECTION

PATENT NO. : 11,894,701 B2  
APPLICATION NO. : 17/346165  
DATED : February 6, 2024  
INVENTOR(S) : Takao Hidaka et al.

Page 1 of 1

It is certified that error appears in the above-identified patent and that said Letters Patent is hereby corrected as shown below:

In the Drawings

On Sheet 8 of 27, in Figure 8, Line 9, delete "CH3" and insert -- CH7 --.

On Sheet 8 of 27, in Figure 8, Line 10, delete "CH3" and insert -- CH5 --.

On Sheet 12 of 27, in Figure 12, Line 8, delete "T)" and insert -- (T) --.

On Sheet 13 of 27, in Figure 13, Line 8, delete "T)" and insert -- (T) --.

Signed and Sealed this  
Seventh Day of January, 2025

Derrick Brent  
*Acting Director of the United States Patent and Trademark Office*